United States Patent
Pandit et al.

(10) Patent No.: US 12,283,988 B2
(45) Date of Patent: *Apr. 22, 2025

(54) LIDAR BASED COMMUNICATION

(71) Applicant: Waymo LLC, Mountain View, CA (US)

(72) Inventors: Salil Shree Pandit, Palo Alto, CA (US); Mark Alexander Shand, Palo Alto, CA (US); Reed Gerard Alexander Morse, Millbrae, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,771

(22) Filed: Feb. 14, 2023

(65) Prior Publication Data

US 2023/0198617 A1    Jun. 22, 2023

Related U.S. Application Data

(63) Continuation of application No. 17/485,960, filed on Sep. 27, 2021, now Pat. No. 11,616,573, which is a
(Continued)

(51) Int. Cl.
*H04B 10/112* (2013.01)
*G01S 17/89* (2020.01)
(Continued)

(52) U.S. Cl.
CPC .......... *H04B 10/1129* (2013.01); *G01S 17/89* (2013.01); *G01S 17/931* (2020.01);
(Continued)

(58) Field of Classification Search
CPC . H04B 10/1129; H04B 10/11; H04B 10/1127; H04B 10/524; H04B 10/676; G01S 17/89
(Continued)

(56) References Cited

U.S. PATENT DOCUMENTS 9,720,410 B2   8/2017   Fairfield et al.
9,983,590 B2   5/2018   Templeton et al.
(Continued)

FOREIGN PATENT DOCUMENTS

CN    104598290 A    5/2015
DE    102011084596 A1    4/2013
(Continued)

OTHER PUBLICATIONS

Yuko et al; A new Automotive VLC System using optical communication image sensor; Jun. 2016; IEEE photonics Journal; pp. 1-17. (Year: 2016).*

(Continued)

*Primary Examiner* — Amritbir K Sandhu
(74) *Attorney, Agent, or Firm* — MCDONNELL BOEHNEN HULBERT & BERGHOFF LLP

(57) ABSTRACT

Systems and methods for performing operations based on LIDAR communications are described. An example device may include one or more processors and a memory coupled to the one or more processors. The memory includes instructions that, when executed by the one or more processors, cause the device to receive data associated with a modulated optical signal emitted by a transmitter of a first LIDAR device and received by a receiver of a second LIDAR device coupled to a vehicle and the device, generate a rendering of an environment of the vehicle based on information from one or more LIDAR devices coupled to the vehicle, and update the rendering based on the received data. Updating the rendering includes updating an object rendering of an object in the environment of the vehicle. The instructions further cause the device to provide the updated rendering for display on a display coupled to the vehicle.

20 Claims, 12 Drawing Sheets

Related U.S. Application Data continuation of application No. 16/502,008, filed on Jul. 2, 2019, now Pat. No. 11,153,010.

(51) Int. Cl.

| | | |
|---|---|---|
| *G01S 17/931* | (2020.01) | |
| *H04B 10/11* | (2013.01) | |
| *H04B 10/524* | (2013.01) | |
| *H04B 10/67* | (2013.01) | |

(52) U.S. Cl.
CPC ......... *H04B 10/11* (2013.01); *H04B 10/1127* (2013.01); *H04B 10/524* (2013.01); *H04B 10/676* (2013.01)

(58) Field of Classification Search
USPC ........................................................ 398/118
See application file for complete search history.

(56) References Cited

U.S. PATENT DOCUMENTS

| | | | |
|---|---|---|---|
| 10,185,327 B1* | 1/2019 | Konrardy | G01C 21/34 |
| 10,281,581 B2 | 5/2019 | Lipson et al. | |
| 10,338,594 B2 | 7/2019 | Long | |
| 10,386,480 B1 | 8/2019 | Campbell | |
| 10,491,885 B1 | 11/2019 | Hicks | |
| 10,567,079 B1 | 2/2020 | Inskeep et al. | |
| 10,690,773 B2 | 6/2020 | Gunnam et al. | |
| 10,740,729 B1 | 8/2020 | Leary et al. | |
| 11,153,010 B2* | 10/2021 | Pandit | G08G 1/207 |
| 11,616,573 B2 | 3/2023 | Pandit et al. | |
| 2007/0124071 A1 | 5/2007 | Joo et al. | |
| 2007/0181810 A1* | 8/2007 | Tan | G01S 7/4811 |
| | | | 250/341.1 |
| 2010/0253539 A1 | 10/2010 | Seder et al. | |
| 2010/0253541 A1 | 10/2010 | Seder et al. | |
| 2016/0282449 A1 | 9/2016 | Slobodyanyuk | |
| 2016/0327648 A1 | 11/2016 | Lipson et al. | |
| 2017/0154462 A1 | 6/2017 | von Cramon | |
| 2017/0336504 A1 | 11/2017 | Kai | |
| 2017/0343652 A1 | 11/2017 | de Mersseman et al. | |
| 2017/0345321 A1 | 11/2017 | Cross et al. | |
| 2018/0164439 A1 | 6/2018 | Droz et al. | |
| 2018/0188358 A1 | 7/2018 | Li et al. | |
| 2018/0196139 A1 | 7/2018 | Brown et al. | |
| 2018/0203124 A1 | 7/2018 | Izzat et al. | |
| 2018/0239005 A1 | 8/2018 | Dussan et al. | |
| 2018/0348346 A1 | 12/2018 | Vallespi-Gonzalez et al. | |
| 2019/0041503 A1 | 2/2019 | Shand | |
| 2019/0261171 A1 | 8/2019 | Cozzetti | |
| 2019/0279374 A1 | 9/2019 | Kim et al. | |
| 2019/0311546 A1 | 10/2019 | Tay et al. | |
| 2019/0317219 A1* | 10/2019 | Smith | G05D 1/228 |
| 2019/0387410 A1 | 12/2019 | Bialer et al. | |
| 2019/0392635 A1 | 12/2019 | Ma et al. | |
| 2020/0022476 A1* | 1/2020 | Gregory | F21V 1/00 |
| 2020/0023838 A1 | 1/2020 | Zhang | |
| 2020/0025935 A1 | 1/2020 | Liang et al. | |
| 2020/0033476 A1* | 1/2020 | Abari | G01C 21/3415 |
| 2020/0041609 A1 | 2/2020 | Ames et al. | |
| 2020/0050190 A1 | 2/2020 | Patel et al. | |
| 2020/0059886 A1 | 2/2020 | Yu et al. | |
| 2020/0062175 A1 | 2/2020 | Lee et al. | |
| 2020/0064837 A1 | 2/2020 | Zhang et al. | |
| 2020/0064847 A1 | 2/2020 | Zhang et al. | |
| 2020/0064859 A1 | 2/2020 | Zhang et al. | |
| 2020/0064861 A1 | 2/2020 | Zhang et al. | |
| 2020/0064862 A1 | 2/2020 | Kwan et al. | |
| 2020/0074060 A1 | 3/2020 | Oh | |
| 2020/0079422 A1 | 3/2020 | Wijffels et al. | |
| 2020/0097016 A1 | 3/2020 | Zhu | |
| 2020/0116827 A1* | 4/2020 | Agarwal | G01S 17/42 |
| 2020/0133271 A1 | 4/2020 | Grundey et al. | |
| 2020/0142032 A1 | 5/2020 | Chen et al. | |
| 2020/0142409 A1 | 5/2020 | Valois et al. | |
| 2020/0284883 A1* | 9/2020 | Ferreira | H04N 25/773 |
| 2020/0324778 A1 | 10/2020 | Diamond et al. | |
| 2020/0341490 A1 | 10/2020 | Silva et al. | |
| 2021/0006332 A1 | 1/2021 | Pandit et al. | |
| 2021/0109538 A1 | 4/2021 | Graefe et al. | |
| 2022/0128367 A1 | 4/2022 | Uchida et al. | |

FOREIGN PATENT DOCUMENTS

| | | |
|---|---|---|
| DE | 102015120683 A1 | 6/2016 |
| JP | H07-223488 A | 8/1995 |
| JP | 6223504 B1 | 11/2017 |
| WO | 03009253 A1 | 1/2003 |
| WO | 2015/134840 A2 | 9/2015 |
| WO | 2017/108221 A1 | 6/2017 |
| WO | 2019031701 A1 | 2/2019 |
| WO | 2020156649 A1 | 8/2020 |

OTHER PUBLICATIONS

Noblis Inc.et al; Vehicle-to-Infrastructure (V2I); Dec. 2016; US department of Transportation; pp. 1-25. (Year: 2016).*
of Lim et al; LIDAR: Lidar Information based Dynamic V2V Authentication for Roadside Infrastructure-less Vehicular Networks; 2019 ; 16th IEEE Annual Consumer Communications and Networking Conference; pp. 1-6. (Year: 2019).*
Feng et al; the Overview of Chinese Cooperative Intelligent Transportation System Vehicular Communication Application Layer Specification and Data Exchange Standard 1; Jun. 2017; Shanghai Jiao tong university; pp. 1-12. (Year: 2017).*
Lim et al; LIDAR: Lidar Information based Dynamic V2V Authentication for Roadside Infrastructure-less Vehicular Networks; 2019, 16 IEEE Annual consumer communications and networking conference; pp. 1-6. (Year: 2019).*
Lim et al; LIDAR: Lidar Information based Dynamic V2V Authentication for Roadside Infrastructure-less Vehicular Networks; 2019; IEEE; pp. 1-6. (Year: 2019).
Goto et al., "A New Automotive VLC System Using Optical Communication Image Sensor," IEEE Photonics Journal, vol. 8, No. 3, Jun. 2016, 17 pages.
Yamazato et al., "Image Sensor Based Visible Light Communication for Automotive Applications," IEEE Communications Magazine, Jul. 2014, pp. 88-97.
Takai et al., "Optical Vehicle-to-Vehicle Communication System Using LED Transmitter and Camera Receiver," IEEE Photonics Journal, vol. 6, No. 5, Oct. 2014, 14 pages.
Takai et al., "LED and CMOS Image Sensor Based Optical Wireless Communication System for Automotive Applications," IEEE Photonics Journal, vol. 5, No. 5, Oct. 2013, 19 pages.
Kim et al., "LIDAR Pulse Coding for High Resolution Range Imaging at Improved Refresh Rate", Optical Society of America, Optical Express, vol. 24, No. 21, Oct. 17, 2016, 19 pages.
Bekhrad et al., "Car to X Communication with Optical Wireless as Support and Alternative to RF-Technologies for Roads and Future Transportation", IEEE, printed from the world wide web on Apr. 17, 2020.
International Search Report and Written Opinion, dated Oct. 15, 2020, for International Patent Application No. PCT/US2020/040388.

* cited by examiner

| | Transmitter ID 302 | Location 304 | Payload Type 306 | Payload 308 |
|---|---|---|---|---|
| Packet 1 | Vehicle_100 | 37.4088053, -122.1048360 | HEARTBEAT | Payload 1 |
| Packet 2 | Vehicle_100 | 37.4088048, -122.1048360 | RENDER_DESCRIPTION | Payload 2 |
| Packet 3 | Vehicle_102 | 37.4088055, -122.1048360 | VEHICLE_LOCATOR | Payload 3 |
| Packet 4 | Unidentified_Vehicle | 37.4088050, -122.1048358 | RENDER_IDENTIFICATION | Payload 4 |
| Packet 5 | Tunnel_40 | 37.4088050, -122.1048370 | GATED_ENTRY | Payload 5 |
| Packet 6 | Toll Booth_30 | 37.4088050, -122.1048365 | FEE_CHARGE | Payload 6 |

Figure 3

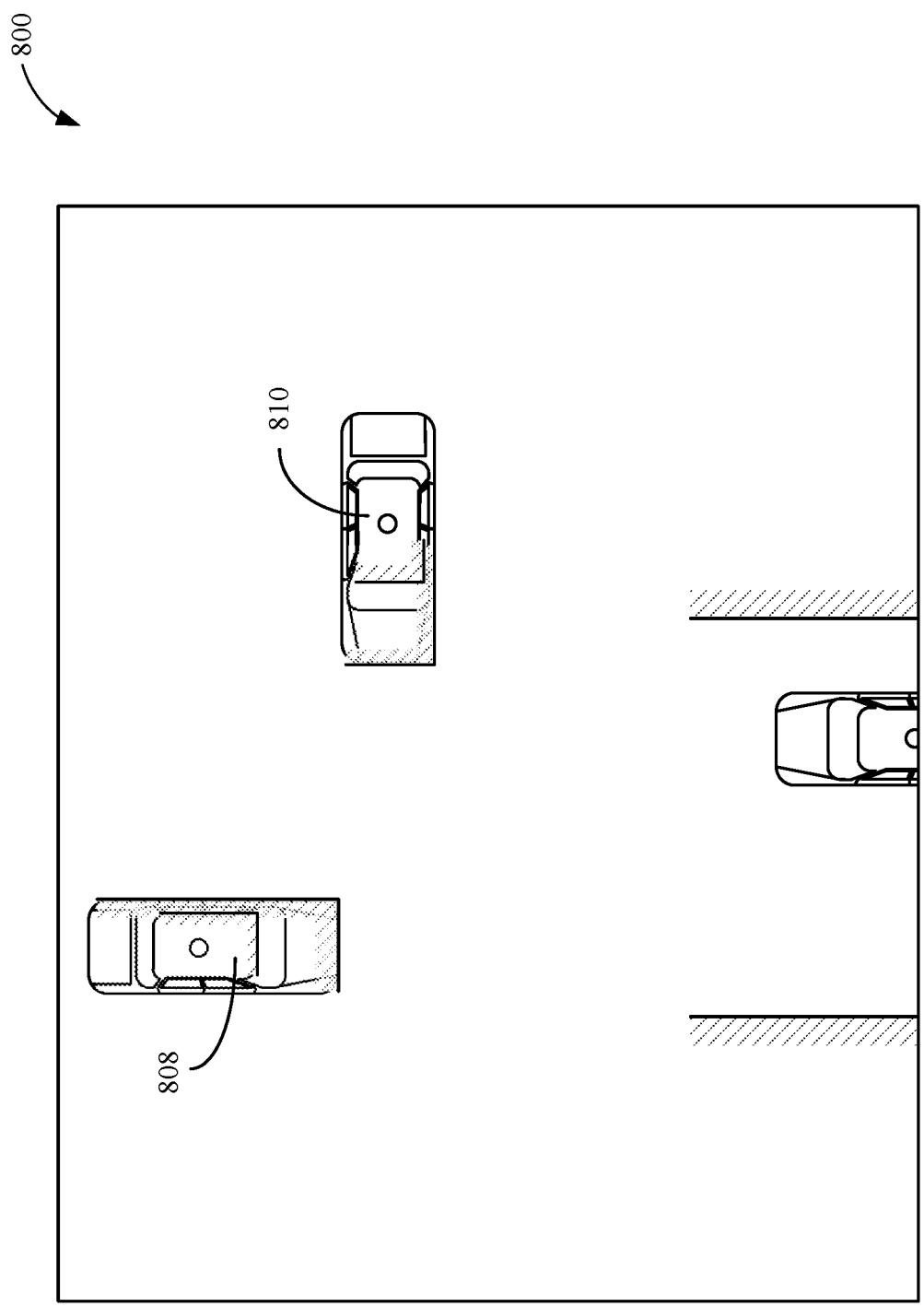

LIDAR BASED COMMUNICATION

CROSS-REFERENCE TO RELATED APPLICATIONS

This application is a continuation of U.S. patent application Ser. No. 17/485,960, filed Sep. 27, 2021, which is a continuation of U.S. patent application Ser. No. 16/502,008, filed Jul. 2, 2019. The foregoing applications are incorporated herein by reference.

TECHNICAL FIELD

This disclosure relates generally to LIDAR devices, and specifically to using LIDARs as a communication channel in self-driving applications.

DESCRIPTION OF THE RELATED TECHNOLOGY

A light detection and ranging (LIDAR) device may be used to detect objects in an environment. For example, a vehicle may include or be coupled to one or more LIDAR devices to detect, e.g., vehicles, pedestrians, traffic signals, obstacles, etc. A LIDAR device emits light at a specific frequency (such as at 800-1000 nm or at 1550 nm), and the LIDAR device receives reflections of the emitted light. The LIDAR device then determines a time-of-flight (ToF) of the light to estimate distances of a number of reflective surfaces while scanning through an environment. The estimated distances may be used to generate a point cloud representation of the environment or otherwise be used to render the environment or assist with vehicle operation.

For example, vehicles can be configured to operate in an autonomous mode in which the vehicle navigates through an environment with little or no input from a driver. An autonomous vehicle may include one or more LIDAR devices to determine distances of objects in the environment, and the distances may be used for controlling navigation of the vehicle. In another example, a vehicle may include one or more LIDAR devices to assist a driver, such as in performing adaptive cruise control, providing cross-traffic warnings, providing lane departure warnings, etc. up to performing all safety-critical driving functions and monitoring roadway conditions in a fully-autonomous system.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Innovative aspects of the subject matter described in this disclosure can be implemented for a device coupled to one or more LIDAR devices. In some implementations, an example device includes one or more processors and a memory coupled to the one or more processors. The memory includes instructions that, when executed by the one or more processors, cause the device to receive data associated with a modulated optical signal emitted by a transmitter of a first LIDAR device and received by a receiver of a second LIDAR device coupled to a vehicle and the device, generate a rendering of an environment of the vehicle based on information from one or more LIDAR devices coupled to the vehicle, and update the rendering based on the received data. Updating the rendering includes updating an object rendering of an object in the environment of the vehicle. The instructions further cause the device to provide the updated rendering for display on a display coupled to the vehicle.

Innovative aspects of the subject matter described in this disclosure can be implemented in a computer readable medium. The computer readable medium stores instructions that, when executed by one or more processors of a device, cause the device to receive data associated with a modulated optical signal emitted by a transmitter of a first LIDAR device and received by a receiver of a second LIDAR device coupled to a vehicle and the device, generate a rendering of an environment of the vehicle based on information from one or more LIDAR devices coupled to the vehicle, and update the rendering based on the received data. Updating the rendering includes updating an object rendering of an object in the environment of the vehicle. The instructions further cause the device to provide the updated rendering for display on a display coupled to the vehicle.

Innovative aspects of the subject matter described in this disclosure can be implemented as a method. An example method includes receiving, by a device, data associated with a modulated optical signal emitted by a transmitter of a first LIDAR device and received by a receiver of a second LIDAR device coupled to a vehicle and the device, generating a rendering of an environment of the vehicle based on information from one or more LIDAR devices coupled to the vehicle, and updating the rendering based on the received data. Updating the rendering includes updating an object rendering of an object in the environment of the vehicle. The method further includes providing the updated rendering for display on a display coupled to the vehicle.

Another example device may include one or more processors and a memory coupled to the one or more processors. The memory includes instructions that, when executed by the one or more processors, cause the device to receive data associated with a modulated optical signal emitted by a transmitter of a first LIDAR device and received by a receiver of a second LIDAR device coupled to an infrastructure (such as a toll booth, road construction area, tunnel entrance, etc.) and the device. The device may generate a rendering of an environment of the infrastructure based on information from one or more LIDAR devices coupled to the infrastructure. The device may also update the rendering based on the received data. Updating the rendering may include updating an object rendering of an object in the environment of the infrastructure. The device may further provide the updated rendering for display. For example, the rendering may be displayed for a toll booth attendant, a central traffic office comptroller, a construction worker foreman at a construction site, etc.

The data may include an indication of the object in the environment, and updating the object rendering may include highlighting the object rendering during display, adjusting the texture of the object rendering, including a representative image of the object in the rendering of the environment, and/or adjusting the dimensions of the object rendering. Displaying the updated rendering may include notifying a viewer that the object in the environment of the infrastructure is an emergency vehicle.

The device may also determine navigation operations for one or more vehicles in the infrastructure's environment based on the received data, and the device may provide the provide the adjusted navigation operations to the one or more vehicles. The modulated optical signal may be received by the second LIDAR device operating in a communications mode, and objects in the infrastructure's environment and line of sight of the second LIDAR device may be sensed by the second LIDAR device operating in a detection mode.

The device may further receive a second data associated with a second modulated optical signal received by the second LIDAR device, and update one or more entries in a local database based on the received second data. In some implementations, the device may transmit data regarding the updates to other LIDAR devices for updating a database local to the other LIDAR devices.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 3 illustrates an example packet format for a plurality of received packets from a LIDAR transmission based on an example communication protocol.

FIG. 8 illustrates an example adjusted rendering of the environment in FIG. 6A.

Like reference numbers and designations in the various drawings indicate like elements.

DETAILED DESCRIPTION

Figure 1:
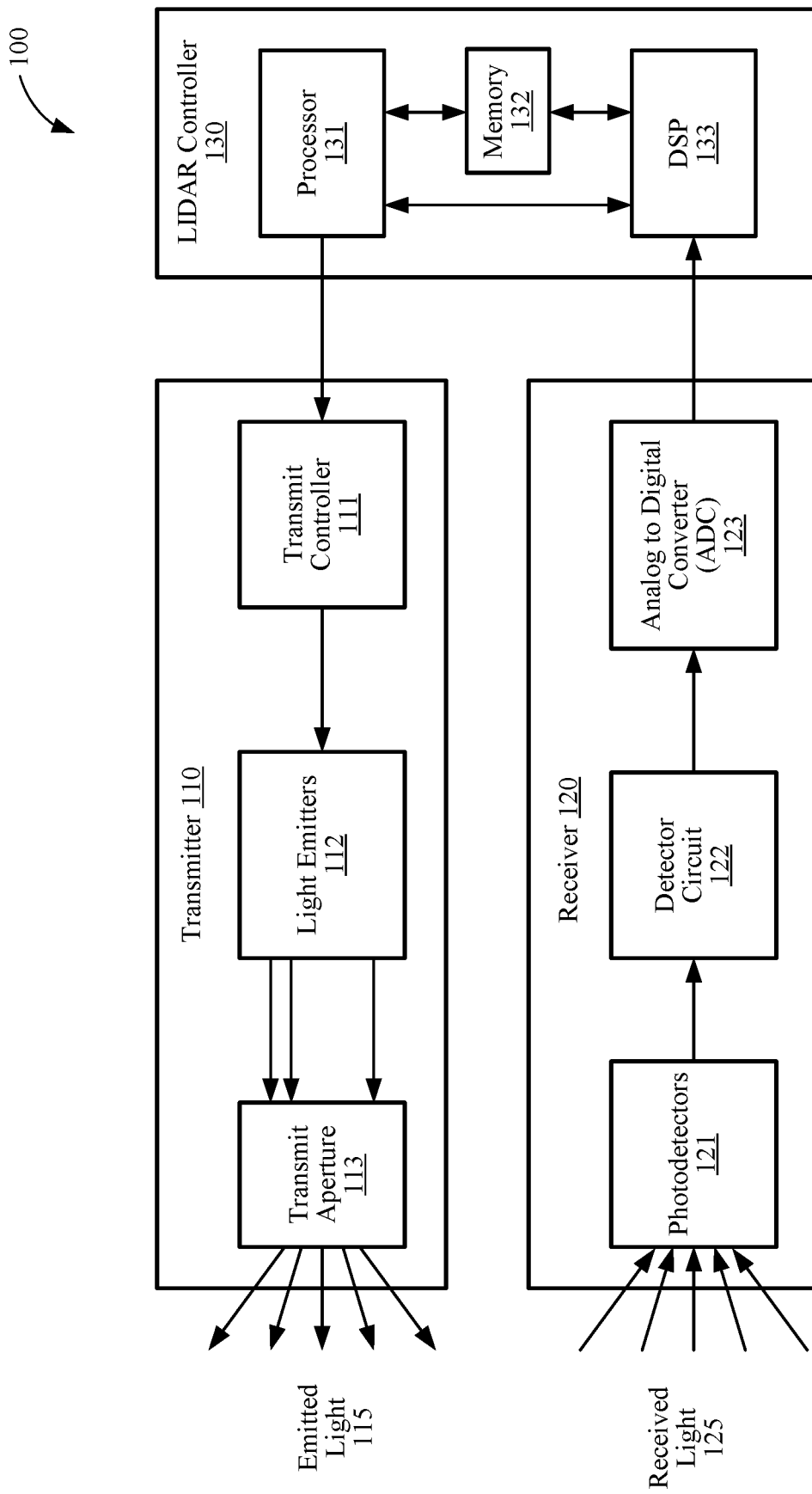
FIG. 1 is a block diagram of an example LIDAR device.

Efforts have been made to couple vehicles and infrastructure via cellular communications. For example, some vehicles include a cellular modem to communicate with other vehicles or devices over the 5 GHz radio spectrum. In another example, a vehicle may be equipped with Dedicated Short Range Communication (DSRC) equipment to communicate with other vehicles or devices over the 5.9 GHz radio spectrum. One problem with cellular or radio technology for communication is that the vehicle may require a cellular connection or require another vehicle or infrastructure to be equipped with consistent technology for communicating. For example, some rural environments or saturated urban environments may not include an available cellular connection, and a vehicle may be unable to communicate with others via its cellular modem. Another problem with cellular technology for communication is the inherent latency associated with the communications. For example, cellular communications between vehicles may require communicating through one or more base stations of a cellular network, which may delay communications. Additionally, the wavelength of radio signals for communication limits the communication bandwidth. Furthermore, cellular and radio signals are typically transmitted omnidirectionally, and transmitting a plurality of omnidirectional signals over the air can quickly saturate the environment.

Many vehicles and infrastructure (such as toll booths, traffic signals, charging stations, etc.) can include or be coupled to one or more LIDAR devices. Additionally, as autonomous vehicles become more commonplace, equipped LIDAR devices will also become more commonplace. In some aspects, a LIDAR device may be configured to communicate with other LIDAR devices in addition to performing ToF measurements (for detecting surfaces in the environment). Since emitted optical signals have a higher frequency than radio signals, communication between LIDAR devices may have a higher communication bandwidth than cellular communications. Additionally, communication between LIDAR devices does not require a cellular network or other infrastructure. Furthermore, optical signals (such as signals with a wavelength close to 1000 nm) may be emitted with a focused dispersion pattern to prevent saturation and interference from multiple optical signals being transmitted concurrently over the air.

Implementations of the subject matter described herein may allow a LIDAR device to communicate with another LIDAR device (called "LIDAR communications" herein). LIDAR communications may be used for vehicle-to-vehicle (V2V) communication or vehicle-to-infrastructure (V2X) communication, and LIDAR communications may occur between any compatible vehicles and/or infrastructure (such as within a fleet of vehicles or between unrelated vehicles including configured LIDAR devices). LIDAR communications may be used for a variety of circumstances and in a variety of use cases, such as described herein.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system, or vehicle including or coupled to one or more LIDAR devices. In some implementations, a "device" for performing operations described herein may refer to a control device or system coupled to a vehicle and one or more LIDAR devices; a vehicle including a control device or system and coupled to one or more LIDAR devices; a control device or system coupled to infrastructure or another non-vehicle system; or another suitable implementation. Similarly, a "vehicle" may refer to a control device or system coupled to the vehicle; the vehicle separate from a control device or system coupled to the vehicle; the combination of the control device or system and the coupled vehicle; or another suitable implementation.

In the following description, numerous specific details are set forth, such as examples of specific components, systems, and processes, to provide a thorough understanding of the present disclosure. Also, in the following description and for purposes of explanation, specific nomenclature and/or details are set forth to provide a thorough understanding of the example embodiments. However, it will be apparent to one skilled in the art that these specific details may not be required to practice the example embodiments. In other instances, well-known circuits, systems, and devices are shown in block diagram form to avoid obscuring the present disclosure. Any of the signals provided over various buses described herein may be time-multiplexed with other signals and provided over one or more common buses. Additionally, the interconnection between components or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. Additionally, the term "coupled" as used herein means coupled directly to or coupled through one or more intervening components or devices.

FIG. 1 is a block diagram of an example light detection and ranging (LIDAR) device 100. The LIDAR device 100 may be used to detect object surfaces in an environment by emitting pulses of lights that illuminate the object surfaces and by detecting light pulses reflected from the object surfaces. The LIDAR device 100 can determine the distance to an object based on the time delay between the emission of a light pulse and the reception of a corresponding light pulse reflected from the selected object. This time delay, which may be referred to as the ToF of the light pulse, may be multiplied by the speed of light to determine the distance between the LIDAR device 100 and the object. Multiple pulses may be used to determine distance information of a number of points associated with the object in the environment. The points may be used to generate a point cloud or otherwise may be used to determine the location, size, shape, pose, and motion of the object. In some implementations, information from the LIDAR device 100 may be used to control an autonomous vehicle, for example, so that the autonomous vehicle can navigate the environment to reach a destination while avoiding obstacles. The LIDAR device 100 may also be used to measure distances for driver assistance operations.

The LIDAR device 100 is shown to include a transmitter 110, a receiver 120, and a LIDAR controller 130. The transmitter 110 may include a transmit controller 111, one or more light emitters 112, and a transmit aperture 113. The light emitters 112 may emit one or more light pulses 125 that can be used to detect objects in a surrounding environment. The light emitters 112 may include any number of suitable light sources such as (but not limited to) laser diodes, light emitting diodes (LEDs), vertical cavity surface emitting lasers (VCSELs), organic light emitting diodes (OLEDs), polymer light emitting diodes (PLEDs), light emitting polymers (LEPs), liquid crystal displays (LCDs), microelectromechanical systems (MEMS), or any other device configured to selectively transmit or emit light pulses 125 at a defined wavelength. The source wavelength may include, for example, the ultraviolet, visible, and/or infrared portions of the electromagnetic spectrum. In some aspects, the light emitters 112 may be disposed on one or more substrates (e.g., printed circuit boards (PCB), flexible PCBs, and the like). Although the light emitters 112 are described herein as emitting light pulses 115, one of ordinary skill in the art will readily understand that the light emitters 112 may transmit or emit light signals, light beams, photons, and the like. Thus, the terms light pulses, light signals, light beams, and photons may be used interchangeably herein.

The transmit aperture 113 is coupled to the light emitters 112, and may include any suitable components (e.g., mirrors, lenses, diffraction gratings, exit apertures, and the like) that can focus, direct, and/or condition the light pulses 115 for emission into the surrounding environment. In some implementations, the transmit aperture 113 may be configured to steer the light pulses 115 in one or more specified directions relative to the LIDAR device 100. The specified directions may span a range of directions, for example, so that distances between the LIDAR device 100 and a number of objects (e.g., vehicles, people, roads, traffic signals, traffic signs, obstacles, etc.) may be determined based on reflections of the light pulses 115 caused by the objects.

The transmit controller 111 may control operations of the light emitters 112 and the transmit aperture 113, may adjust a number of parameters or settings of the light emitters 112 and the transmit aperture 113, or both. In some implementations, the transmit controller 111 may be responsive to one or more control signals provided by the LIDAR controller 130. For example, the transmit controller 111 may adjust the width, the timing, the frequency, and/or the amplitude (intensity) of the light pulses 115 emitted by the light emitters 112 based on the one or more control signals. In other implementations, the transmit controller 111 may be omitted or may be included within the LIDAR controller 130.

The receiver 120 may include a number of photodetectors 121, a detector circuit 122, and an analog-to-digital converter (ADC) 123. The photodetectors 121 may receive light pulses 125 (e.g., photons) from the surrounding environment. In some implementations, the received light pulses 125 may include components of the emitted light pulses 115 reflected from one or more objects in the surrounding environment. The photodetectors 121 may be configured to convert the received light pulses 125 into photodetector signals (e.g., analog current signals) indicative of intensity levels of the received light pulses 125. The photodetectors 121 may be any suitable component or device that can receive or sense light including, for example, photodiodes (such as avalanche photodiodes), Silicon Photomultipliers (SiPMs), phototransistors, cameras (such as CMOS sensors), active pixel sensors (APS), charge coupled devices (CCD), cryogenic detectors, or the like. In some implementations, the photodetectors 121 are reverse-biased photodiodes that generate a current in response to receiving light pulses, for example, such that the amount of current through each photodiode is proportional to the intensity of light pulses received by the photodiode.

Although not shown for simplicity, the receiver 120 may include optics to filter wavelengths of the received light so that the photodetectors 121 primarily receive light corresponding to the wavelength of the light pulses 115 emitted by the transmitter 110 (and receive minimal light corresponding to other wavelengths). For example, the receiver 120 may include a bandpass filter to filter optical signals outside of a range of wavelengths centered around a base wavelength of the light pulses emitted by the transmitter 110.

The detector circuit 122 may use any suitable technique to sample photodetector signals provided by the photodetectors 121 to determine intensity levels of the received light pulses 125. In some implementations, the detector circuit 122 may sample the photodetector signals at a number of intervals or sampling times. In other implementations, the detector circuit 122 may continuously sample the photodetector signals. The detector circuit 122 may provide the determined intensity levels to the ADC 123, for example, as analog signals having a magnitude (e.g., a voltage magnitude or a current magnitude) indicative of light information contained in the photodetector signals. In some aspects, the detector circuit 122 may amplify and/or filter the photodetector signals.

The ADC 123 may receive analog signals indicating intensity levels of the received light pulses 125 from the detector circuit 122, and may convert the analog signals into digital data that can be processed by the LIDAR controller 130. The ADC 123 may be any suitable ADC such as (but not limited to) a flash ADC, a successive-approximation-register (SAR) ADC, or a delta-sigma ADC. In some implementations, each photodetector 121 may correspond to a respective ADC. In other implementations, a plurality of photodetectors 121 may correspond to a single ADC (e.g., to reduce the size, cost, and/or power consumption of the LIDAR device 100). In some other implementations, the ADC 123 may be omitted. Each of the photodetectors 121 (and corresponding ADCs 123) may be associated with a specific light emitter 112. In this manner, multiple ToFs may be measured, and therefore multiple distances may be determined during one pass of the LIDAR device 100.

The LIDAR controller 130 may include a processor 131, a memory 132, and a digital signal processor (DSP) 133. The DSP 133 may process digital data provided by the one or more ADCs 123 to determine information regarding the light pulses received by any number of the photodetectors 121. In some implementations, the intensity and/or time of arrival of the light pulses may be used to determine the size, shape, and location of a number of detected objects in the surrounding environment. For example, with the time of departure of a light pulse known, the DSP 133 may use the time of arrival to determine the ToF. In another example, with the intensity of the emitted light pulse known, the DSP 133 may use the measured intensity to determine an energy loss of the reflected light pulse. Objects that are relatively close to the LIDAR device 100 may reflect emitted light pulses 115 before objects that are relatively far from the LIDAR device 100. In addition, light reflected from objects that are relatively close to the LIDAR device 100 may have less pulse spreading than light reflected from objects that are relatively far from the LIDAR device 100 (assuming similar surface reflectivity between the objects at varying distances). Thus, in some implementations, the distance between the LIDAR device 100 and an object may be estimated based on the rising and falling edges of the received light pulses 125.

The processor 131 may be any suitable one or more processors capable of executing scripts or instructions of one or more software programs stored in the LIDAR device 100 (e.g., within the memory 132). In some implementations, the processor 131 may include one or more microprocessors and memory providing at least a portion of machine-readable media within which program instructions or scripts can be stored. In other implementations, the processor 131 may be an Application Specific Integrated Circuit (ASIC). In some other implementations, the processor 131 may be or include one or more Field Programmable Gate Arrays (FPGAs) or Programmable Logic Devices (PLDs).

The memory 132 may store information pertaining to the transmitter 110, the receiver 120, the surrounding environment, or any combination thereof. The memory 132 may also include a non-transitory computer-readable medium (e.g., one or more nonvolatile memory elements, such as EPROM, EEPROM, Flash memory, a hard drive, and so on) that may store a number of software (SW) modules each including instructions that, when executed by the processor 131, causes the LIDAR device 100 to perform all or a portion of the operations described herein. In some other implementations, the LIDAR controller 130 may be instructed by one or more processors outside the LIDAR device 100 (such as included in a vehicle's processing system coupled to the LIDAR device 100) to perform one or more operations regarding the emission or reception of light pulses. For example, the LIDAR device 100 may be coupled to a processing hub of a vehicle (such as via a Controller Area Network (CAN) Bus) or another processing system of the vehicle, and the processing system may instruct the LIDAR device 100 to perform one or more operations and receive information from the LIDAR device 100 in response (such as retrieving ToF or intensity information measured by the LIDAR device 100 and used by the processing system to generate a point cloud or other type of depth map or rendering of the environment).

Figure 2A:
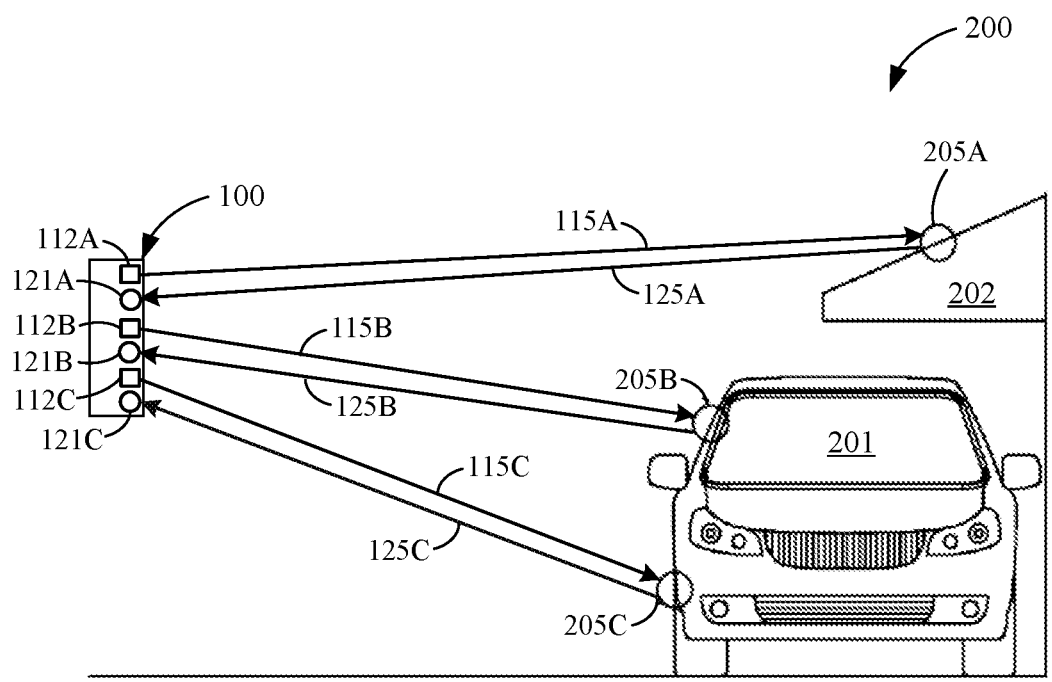
FIG. 2A illustrates an example LIDAR device in an environment.

FIG. 2A illustrates an example LIDAR device in an environment. In the example of FIG. 2A, the LIDAR device 100 is situated in an environment 200 including an automobile 201 and an overhang 202. In a simplified example, the LIDAR device 100 is shown to include three light emitters 112A-112C that emit respective light pulses 115A-115C into the environment 200. The LIDAR device 100 is also shown to include three photodetectors 121A-121C that receive respective light pulses 125A-125C reflected from surfaces of objects in the environment 200. A first light pulse 115A illuminates a surface 205A of the overhang 202, and a first photodetector 121A receives a corresponding reflected light pulse 125A. A second light pulse 115B illuminates a surface 205B of the automobile 201, and a second photodetector 121B receives a corresponding reflected light pulse 125B. A third light pulse 115C illuminates another surface 205C of the automobile 201, and a third photodetector 121C receives a corresponding reflected light pulse 125C. The LIDAR device 100 may use one or more properties of the received light pulses 125A-125C (e.g., timing, amplitude, pulse width, and so on) to determine the distance between the LIDAR device 100 and each of the surfaces 205A-205C in the environment 200.

Figure 2B:
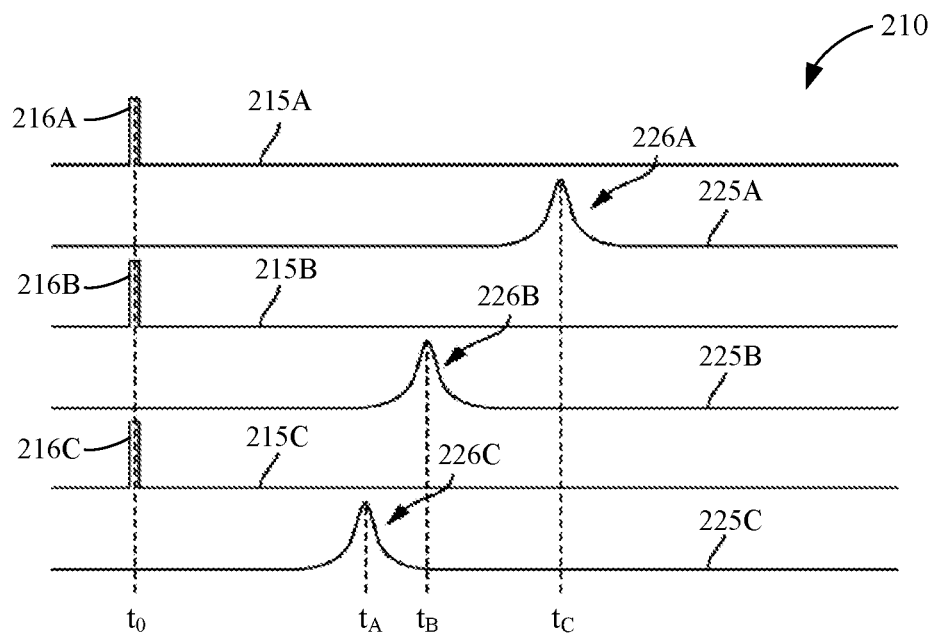
FIG. 2B is an example timing diagram of waveforms corresponding to emitted light pulses and received light pulses of an example LIDAR device.

FIG. 2B is an example timing diagram 210 of waveforms corresponding to emitted light pulses and received light pulses of an example LIDAR device. Transmit waveforms 215A-215C may be indicative of intensity levels of respective light pulses 115A-115C emitted from the LIDAR device 100 of FIG. 2A, and receive waveforms 225A-225C may be indicative of intensity levels of respective light pulses 125A-125C received by the LIDAR device 100 of FIG. 2A. The light pulses 115A-115C are emitted from the LIDAR device 100 at the same time $t_0$ (or at least substantially the same time), and the reflected light pulses 125A-125C are received by the LIDAR device 100 at different times $t_A$-$t_C$ (e.g., due to different distances between the LIDAR device 100 and each of the surfaces 205A-205C of the environment 200). The transmit waveforms 215A-215C include respective pulses 216A-216C that represent the time $t_0$ at which corresponding light pulses 115A-115C are emitted from the LIDAR device 100. The receive waveforms 225A-225C include respective pulses 216A-216C that represent the times $t_A$-$t_C$ at which corresponding reflected light pulses 125A-125C are received by the LIDAR device 100. The reception times $t_A$-$t_C$ may be determined from respective pulses 226A-226C using any suitable peak detection technique (e.g., determining a peak amplitude, determining a centroid, determining a mean time between threshold crossings, and the like). The determined reception times $t_A$-$t_C$ may be used to determine distances between the LIDAR device 100 and respective surfaces 205A-205C of the environment 200.

Many LIDAR devices allow adjusting one or more features of the emitted light pulses. For example, a LIDAR device 100 (FIG. 1) may configure the transmitter 110 to adjust one or more of the timing of the light pulses, the frequency of the light pulses, or the intensity of the light pulses for the emitted light 115. In some examples, the LIDAR device 100 allows dithering of the light pulses for the emitted light 115 to control the timing. Some LIDAR devices may allow adjusting the power provided to the light emitters 112 (such as LEDs) to control the intensity. Some LIDAR device may allow adjusting a reference signal frequency (such as the light source) to adjust the frequency of the light pulses of the emitted light 115. The receiver 120 may also be configured to sense differences in timing, frequency, or intensity of the light pulses for the received light 125. For example, the sensitivity of a photodiode array for the photodetectors 121 may be sufficient to determine differences in intensities, and the sampling rate of the photodiode array and/or the ADCs may be sufficient to determine differences in timing or frequency of the light pulses for the received light 125.

In some aspects, a LIDAR device 100 (such as the LIDAR controller 130) may be configured to encode information into the emitted light 115 via frequency adjustment, intensity adjustment, and/or time dithering of the pulses to be emitted, and the transmitter 110 may be configured to communicate such encoded information via the emitted light 115. For example, the LIDAR device 100 may receive a data signal to be transmitted, and the LIDAR device 100 may use the light to be emitted (which may be referred to as an optical signal herein) as a carrier signal. In this manner, the LIDAR device 100 may modulate the optical signal to include the data signal, and the LIDAR device 100 may transmit the modulated optical signal. For a first LIDAR device, the receiver 120 may be configured to receive a modulated optical signal transmitted by a transmitter 110 of a second LIDAR device. The modulated optical signal is encoded with a data signal from the second LIDAR device, and the LIDAR controller 130 of the first LIDAR device may be configured to extract the data signal from the received modulated optical signal. For example, the LIDAR controller 130 may demodulate the received optical signal to generate the data signal. Since such communication between LIDAR devices is point-to-point (and thus not requiring a central network) and the frequency of the signals is greater than for cellular communications, the throughput may be higher and the latency may be lower than for traditional cellular communications. A "modulated optical signal" herein refers to an optical signal (such as light emitted by a LIDAR device 100) modulated to include a data signal.

In some implementations, the LIDAR device 100 may be configured to switch between a distance measurement mode (which may be called a "detection mode" herein) and a communication mode for transmitting a modulated optical signal including a data signal. For example, the LIDAR controller 130 may determine when the LIDAR device 100 is to transmit or receive information via a modulated optical signal and when the LIDAR device 100 is to operate in detecting surfaces of objects in an environment. For example, the LIDAR controller 130 may determine to place the LIDAR device 100 in a communication mode for a first portion of time and place the LIDAR device 100 in a detection mode for a second portion of time. The LIDAR device 100 may therefore switch between communication and detection modes. In some other implementations, emitted light 115 may be used for communicating information to another receiver (such as via adjusting the frequency) and also used for detecting surfaces of objects (such as via sensing differences in intensities in the received light 125), and the LIDAR device 100 may be configured to perform both modes concurrently. For example, a LIDAR device 100 may emit a modulated optical signal (including a data signal). The LIDAR device 100 may receive reflections of the modulated optical signal and use the reflections for determining depths of objects from the LIDAR device 100. Additionally, a second LIDAR device may receive the modulated optical signal and demodulate the optical signal to generate the included data signal from the LIDAR device 100.

A device, such as a vehicle or infrastructure, may include or be coupled to one or more LIDAR devices (such as the LIDAR device 100) configured to communicate a data signal (provided by, e.g., the vehicle or infrastructure) via the emitted light 115. In this manner, the device may communicate with vehicles or infrastructure using the configured LIDAR device. In some aspects, the LIDAR device 100 may be configured to use a communication protocol adopted by other vehicles and infrastructure including LIDAR devices. The communication protocol may be ad-hoc or managed, and any suitable packetization of information may be used for the communication protocol. For example, LIDAR communications within a fleet of vehicles may be based on a specific protocol. In some implementations, a standardized protocol (or a protocol adopted by multiple parties) may more easily allow integration of LIDAR communications between vehicles and infrastructure. Such a protocol may include a defined packet format for transmitting and receiving information. Protocols from other communication mediums, such as cellular communications, Wi-Fi communications, digital subscriber line (DSL) communications, fiber optic communications, etc., may be leveraged in creating a protocol for communications between LIDAR devices.

FIG. 3 illustrates an example packet format for a plurality of received packets 300 based on an example communication protocol. In some implementations, the LIDAR device 100 may include a buffer or other suitable memory (such as memory 132) for queuing one or more received packets 300 (such as the packets 1-6). The LIDAR device 100 may process the buffered packets for the vehicle or infrastructure to perform one or more operations. In another example, the buffered packets may be provided to a processing system of the device for processing. As illustrated, the format for packets 1-6 includes fields 302-308, which includes a transmitter ID 302, a location 304, a payload type 306, and a payload 308. Additional fields, fewer fields, different fields, or a different organization of fields may be included in the packets, as any suitable packet format may be used. For example, the packets 1-6 may include a cyclic redundancy check (CRC) field after the payload 308 to correct any errors in the received packet.

The transmitter ID 302 may indicate the device transmitting the packet. In some implementations, each vehicle may include a unique identifier to identify that specific vehicle. For example, if a fleet of 200 autonomous vehicles communicate with one another, each vehicle may include an identifier unique from the other vehicles in the fleet (such as "vehicle_1" through "vehicle_200"). If a LIDAR device equipped on a vehicle associated with "vehicle_100" transmits packets 1 and 2 to the LIDAR device 100, the transmitter ID 302 of the packets may include the unique identifier "vehicle_100." Similarly, if a LIDAR device equipped on a vehicle associated with "vehicle_102" transmits packet 3 to the LIDAR device 100, the transmitter ID 302 of the packet may include the unique identifier "vehicle_102." Some vehicles may not include a unique identifier or otherwise not be identified, but the vehicles may still communicate packets to the LIDAR device 100. In one example, the transmitter ID 302 may include a transmitter ID value specific to previously unidentified vehicles or devices (illustrated as "Unidentified_Vehicle" for packet 4). The transmitter ID value may be, e.g., zero padding, a field with null values, or otherwise suitably filled to indicate no unique identifier for the vehicle or infrastructure associated with the packet.

Infrastructure (such as toll booths, tunnels, entry gates for high occupancy vehicle (HOV) lanes, etc.) may include or be coupled to one or more LIDAR devices to transmit and receive packets to and from the LIDAR device 100. For example, packet 5 may be transmitted by a transmitter positioned at the entrance of a tunnel (which may be uniquely identified as "Tunnel_40"), and packet 6 may be transmitted by a transmitter positioned at a toll booth (which may be uniquely identified as "Toll Booth_30"). Any suitable vehicle or infrastructure may include a LIDAR device for LIDAR communications and may include a unique transmitter ID.

In some implementations, emergency vehicles, construction zones, and other devices associated with priority transmissions may include a Transmitter ID indicating that the packet is for a priority transmission. If the LIDAR device 100 decodes the packet sequentially, the LIDAR device 100 may process the transmitter ID 302 first and determine that the packet is a priority transmission. In this manner, the LIDAR device 100 may determine that the packet is to be prioritized before completing processing the remainder of the packet. Other suitable implementations of a transmitter ID 302 may be used, and the present disclosure is not limited to the provided examples. For example, a transmitter ID may be configured to differentiate between fleets, vehicle types (such as personal cars, commercial trucks, school buses, etc.), etc.

The location 304 may indicate the location of the vehicle or infrastructure associated with the transmitting device. For example, a vehicle or infrastructure may include a global positioning system (GPS) receiver to determine a latitude and longitude. The latitude and longitude may then be provided in the location 304, such as illustrated for packets 1-6. Location 304 may alternatively include positioning information relative to the LIDAR device 100, such as determined by the other vehicle or infrastructure via its own LIDAR device. For example, the transmitting LIDAR device may determine a relative distance and position between the transmitting and receiving vehicles or infrastructure, and the device distance and position may be transmitted in the location 304. In some implementations, if location information is not available to send (such as a vehicle does not include a GPS receiver), the location 304 may be padded with zeros or otherwise filled to indicate no location is provided.

The payload type 306 may indicate the type of information to be provided in the payload 308 of the packet. In the example packets 1-6, packet 1's payload type 306 indicates a "HEARTBEAT" or "BEAT" which may be a signal periodically transmitted by "Vehicle_100." In some implementations, a "HEARTBEAT" or "BEAT" may indicate that the packet is similar to a beacon, and base information may be provided in the payload 308. In some examples of providing base information of the vehicle or infrastructure, the payload 1 may include a dither rate or other operating parameters for the transmitter and/or trajectory information or other state information for a vehicle. Alternatively, no information may be provided in the payload 308 for such packets (e.g., the payload is zero padded and the packet is only for providing location information via location 304 and to apprise other devices of the existence of the transmitter).

The payload type 306 for packet 2 is "RENDER_DESCRIPTION." As described in example use cases below, a LIDAR device 100 may measure surfaces within the line of sight (LoS) of the LIDAR device 100, but surfaces not within the LoS of the LIDAR device 100 may not be sensed and detected. In this manner, a rendering of the environment based on measurements from the LIDAR device 100 may not include portions of a vehicle not within view of the LIDAR device 100. The "RENDER_DESCRIPTION" may indicate that basic information regarding rendering the vehicle or infrastructure may be provided in the payload 308. For example, payload 2 may include dimensions of one or more shapes associated with "Vehicle_100" to be rendered. In one implementation, the dimensions may include an orientation and dimensions of a geometric shape (such as a rectangle for two-dimensional rendering or a rectangular prism for three dimensional rendering). Other suitable rendering information may include the texture, outline, or other features of the object's rendering indicated by the payload 308. For example, an emergency vehicle or a road construction zone may be highlighted in a rendering displayed by a vehicle to a driver and/or passenger. The payload 308 may thus indicate a texture to highlight the portion of the rendering associated with the emergency vehicle or construction zone. In another example implementation, a similar texture may be used for vehicles within the same fleet. In this manner, a driver and/or passenger may easily identify fleet vehicles in a displayed rendering. Any suitable rendering description may be used, though, and the present disclosure is not limited to the provided examples.

Additional or alternative to a "RENDER_DESCRIPTION," the payload type 306 may indicate a "RENDER_IDENTIFICATION," such as for packet 4. In some implementations, a list of standard vehicles (or infrastructure) and their associated rendering information may be stored in a database (such as a look-up table or another suitable set of data organized for access). For example, if the vehicle transmitting the packet is a 1994 Geo Metro, the payload 308 (such as payload 4) may indicate a "1994 Geo Metro." The database may be used in determining the rendering details for the specific vehicle (such as the dimensions and textures for rendering), and an existing rendering may be enhanced by the additional rendering details. The database may also include information about the specific vehicle, e.g., length, acceleration capability, etc. The term "rendering," herein, may mean line drawings, point clouds, depth maps, images, texture, shading, or other information that may be visualized or displayed.

The payload type for packet 5 is "GATED-ENTRY," which may indicate that payload 5 indicates the type of vehicles allowed to enter "Tunnel_40." For example, "Tunnel_40" may be limited to high occupancy or autonomous vehicles, which may be indicated in packet 5. The vehicle including the LIDAR device 100 may thus determine whether entry into "Tunnel_40" is permitted based on the information in payload 5.

The payload type of packet 6 is "FEE_CHARGE," which may indicate that payload 6 indicated the fee charged by "Toll Booth_30." For example, if a bridge toll is five dollars, payload 6 may indicate that five dollars is to be automatically collected from a driver or fleet's account when the vehicle passes "Toll Booth_30." In some implementations, the payload 308 may include a combination of fees to be charged and limitations on vehicle entry. For example, a transmitter for a parking garage space may indicate the rate to park as well as the allowed vehicles in the space (e.g., reserved for electric vehicle space, designated handicapped parking, etc.). While the vehicle is parked in the space, the transmitter may update the fees for parking based on the rate so that a driver may be aware of the current parking costs.

The payload type of packet 3 is "VEHICLE_LOCATOR," which may indicate that payload 3 indicates a vehicle that is attempting to be found. For example, if "Vehicle_005" is offline, the vehicles in the fleet may send packets attempting to locate "Vehicle_005." In this manner, payload 3 may include the "Vehicle_005" identifier to indicate which vehicle is to be located. In some implementations, the LIDAR device 100 may persist a number of transmitter IDs of packets received. The LIDAR device 100 may therefore be configured to search the persisted transmitter IDs of packets received to determine if "Vehicle_005" communicated with the LIDAR device 100. The LIDAR device 100 may then indicate such to "Vehicle_102." For example, the LIDAR device 100 may transmit the location received in the packet from the "Vehicle_005" to the "Vehicle_102." In some other implementations, the LIDAR device 100 may be configured to propagate the message to other vehicles or infrastructure, thus indicating that "Vehicle_005" is to be located. In this manner, if "Vehicle_005" receives the propagated message from another vehicle or infrastructure, the "Vehicle_005" may determine to communicate with the fleet its location.

Other suitable payload types and payloads may exist (such as for different use cases for LIDAR communication as described herein), and the present disclosure is not limited to the provided examples. In some example implementations, a vehicle may include a plurality of sensors to collect information for packet generation. For example, a payload may include information regarding the number of passengers, the operating mode of the vehicle, etc., and sensors, such as pressure sensors, occupancy sensors, engine sensors to detect the operating mode, etc. may be used to collect such information.

A diverse range of information may be provided and received via LIDAR communications, and LIDAR communications may apply to a variety of use cases, such as described herein.

LIDAR Communication Implementations
Vehicle Locator

A vehicle may operate in areas without a cellular network for communication. For example, when a vehicle crosses rural or sparsely populated areas, the vehicle may not have a consistent cellular connection or otherwise be able to communicate with a base station. In another example, the vehicle's cellular modem may be inoperable. If the vehicle is part of a fleet of vehicles (such as a taxi or rental car fleet), a dispatcher may be unable to identify the location of the vehicle, and the dispatcher may wish to find the vehicle.

In some implementations, searching for a missing, stranded, or offline vehicle may be proactive, where a vehicle or infrastructure finding an offline vehicle reports back to the dispatcher that the offline vehicle is found. In some other implementations, searching for an offline vehicle may be reactive, where a vehicle logs the last known location of the offline vehicle. In this manner, the vehicle reports its findings when syncing with the dispatcher or other portions of the fleet (such as when the vehicle is charging or otherwise not in operation).

Other vehicles in the fleet may be instructed to transmit a Vehicle Locator message via LIDAR communication. For example, each of the fleet vehicles may be instructed to periodically transmit a packet with a payload type of "Vehicle_Locator," identifying the offline vehicle in the packet payload. The dispatcher may also instruct infrastructure, such as fleet owned electric vehicle charge stations or parking spaces that include or are coupled to a LIDAR device, to transmit Vehicle Locator messages. As described above, other vehicles may also propagate such messages once received to expand the number of transmitters sending the Vehicle Locator message. In this manner, the vehicle, which may be offline relative to its primary communication method, e.g., cellular, may receive the message from a passing vehicle or infrastructure, and the vehicle may determine to communicate its location to the dispatcher via the LIDAR communication. In another example, the vehicle or infrastructure finding the offline vehicle may communicate the offline vehicle's location to the dispatcher.

For example, if another fleet vehicle is in LIDAR communication with the offline vehicle, the offline vehicle may transmit a message to the other fleet vehicle via LIDAR communication that its cellular modem is inoperable and to, e.g., contact the dispatcher via the other vehicle's cellular modem. In this manner, the dispatcher may communicate with the offline vehicle via the other fleet vehicle.

In addition or alternative to a dispatcher finding an offline fleet vehicle, Vehicle Locator messages may be used in emergency situations, such as for stolen vehicles. A payload of a Vehicle Locator packet may include a description of the vehicle to be found, and such packet may be propagated to other vehicles and infrastructure to find the stolen vehicle. In some implementations, a vehicle may display a notification to the driver in response to receiving the packet. In some other implementations, the stolen vehicle may be automatically identified based on the dimensions or other properties of the stolen vehicle. For example, detected surfaces of other vehicles using a LIDAR device may be used to identify a vehicle with the same make and model based on similar dimensions or other features of the stolen vehicle. In another example, a visible light camera may be used to capture an image of a license plate after detecting a missing vehicle, and the image may be analyzed to identify the missing vehicle based on the license plate number. The vehicle may report (such as via a cellular modem) the location of the missing vehicle to a central office.

In some other implementations, a Vehicle Locator message may be initiated by an offline or disabled vehicle. For example, a fleet vehicle's cellular modem may become inoperable, and the fleet vehicle is unable to communicate with the fleet via a cellular network. If the dispatcher provides information about where the fleet vehicle is to go via cellular communications, the fleet vehicle may not be able to determine where the dispatcher wishes to send the vehicle. In the example of an autonomous vehicle taxi fleet, the dispatcher may wish to send the vehicle to pick up a client at a specific address and taxi the client to a specific destination. However, the vehicle is unable to receive the instructions from the dispatcher. LIDAR communications may be used to provide the dispatcher with any messages from the vehicle (such as the vehicle having a disabled cellular modem). For example, the vehicle may transmit, to other fleet vehicles via LIDAR communications, messages intended for the dispatcher. The other fleet vehicles may then transmit the messages to the dispatcher. In this manner, the dispatcher is apprised that the vehicle may not be able to receive messages from the dispatcher, and the dispatcher may update handling requests without the vehicle in the fleet. The dispatcher may also provide instructions to the vehicle via LIDAR communications (such as via other fleet vehicles) to wait at a designated spot for service, remove itself from the fleet's operation, or any other suitable operations.

In some implementations, the vehicle may have a home location away from the taxi fleet dispatcher. For example, if the vehicle does not have a location to go to (such as for a fare communicated by the dispatcher), the vehicle may return to a designated spot in a service area, such as a specific parking space for the vehicle within the service area. The space may be associated with a LIDAR device that may communicate with the vehicle (allowing, e.g., the dispatcher to communicate with the vehicle). When the vehicle is fully operable and back in standard communication with the dispatcher, the designated spot may be a holding area for the vehicle until the vehicle is activated for a fare. When the vehicle is unable to communicate with the dispatcher and is not in use for a fare, the vehicle may also return to the designated spot (such as the parking space). References to offline vehicles herein may refer to stranded, missing or other vehicles that are not operating or may not be expected to operate within a default, typical, or standard operating mode.

Figure 4:
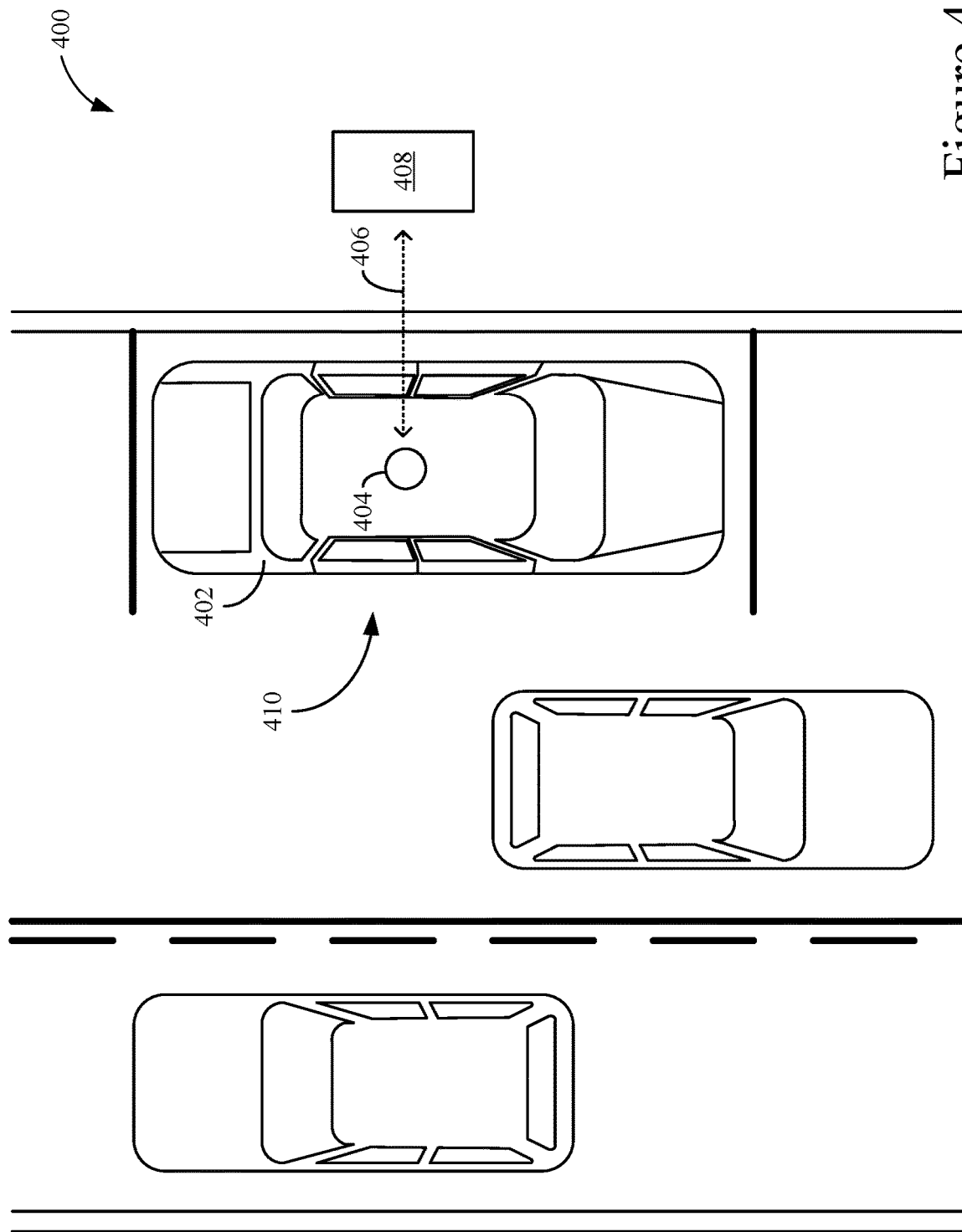
FIG. 4 illustrates an environment including an example parking space for an autonomous fleet vehicle to return to when not in use.

FIG. 4 illustrates an environment 400 including an example parking space 410 for an autonomous fleet vehicle 402 to return to when not in use. The autonomous vehicle 402 includes one or more LIDAR devices, such as the LIDAR device 404. A stand 408 may be situated near the parking space 410. Examples of the stand 408 include a parking meter, a charging station, and a taxi stand for walk-up clients. In some implementations, the stand 408 includes a LIDAR device to communicate with the vehicle 402 via LIDAR communications 406. The stand 408 also includes a wired or wireless backhaul (such as a cellular modem or fiber-optic connection). The vehicle 402, which is unable to communicate directly with the dispatcher, may communicate with the stand 408 via LIDAR communications, and the stand 408 may communicate with the dispatcher via the backhaul. While the vehicle 402 is described as communicating with the stand 408 via LIDAR communications, additional or alternative communications systems may be used in some other embodiments. Other systems may include wireless local area network systems (such as IEEE 802.11 based systems), BLUETOOTH® systems, cellular systems (such as 3G, 4G, 5G, etc.), visible light communication systems, near field communication (NFC) systems, etc.

In communicating with the stand 408, the vehicle 402 may provide a Vehicle Locator packet to the stand 408. In some implementations, transmitting the Vehicle Locator packet may indicate to the stand 408 and the dispatcher that the vehicle 402 is unable to communicate directly with the dispatcher (such as via a cellular modem). In some examples, the dispatcher may remove the vehicle 402 from service, send a maintenance crew to the vehicle 402, send a location for the vehicle 402 to go for maintenance, or communicate a new fare to be handled by the vehicle 402. In some implementations, the stand 408 may also communicate with the vehicle 402 while passing on the road. If the vehicle 402 is unable to communicate directly with the dispatcher, the stand 408 may update the dispatcher with a location of the vehicle 402.

Vehicle Hailing

In addition to locating a vehicle, LIDAR communication may be used for hailing a vehicle. Referring back to FIG. 4, the stand 408 may be a walk-up taxi stand. A person may walk-up to the stand 408 and enter a desired destination (such as via a smartphone application, a graphical user interface of the stand 408, or another suitable interface with the stand 408). A plurality of automated vehicles may be queued at a location away from the stand 408 (such as in a parking lot around the corner) and in communication with another LIDAR transmitter (such as one or more stands in the parking lot). The parking space 410 may be the location where the next vehicle in the queue is hailed, and the parking space 410 may be where the user enters the vehicle and embarks on the requested ride.

The stand 408 may handle multiple requests for rides concurrently. As a result, the stand 408 may hail a plurality of vehicles (such as using one or more LIDAR transmitters in the staging area for the queued vehicles). Each hailed vehicle may be assigned a specific client or ride, and when the vehicle approaches the parking space 410, the vehicle may indicate to the stand 408 (via LIDAR communication 406) the ride assigned. In this manner, the stand 408 may notify the clients of the ride assigned to the vehicle in the parking space 410 to expedite embarkation and coordinate rides for multiple clients from the same parking space 410.

Notifications

LIDAR communication may be used to provide notifications to vehicles or drivers. For example, a vehicle may be notified of, e.g., an approaching emergency vehicle, a road hazard, a school crossing during school hours, changes in the speed limit, a construction zone, etc., via LIDAR communication. For emergency vehicles, an emergency broadcast may be communicated by infrastructure and vehicles previously receiving the broadcast to notify other vehicles of the presence of an emergency vehicle via LIDAR communication.

Figure 5:
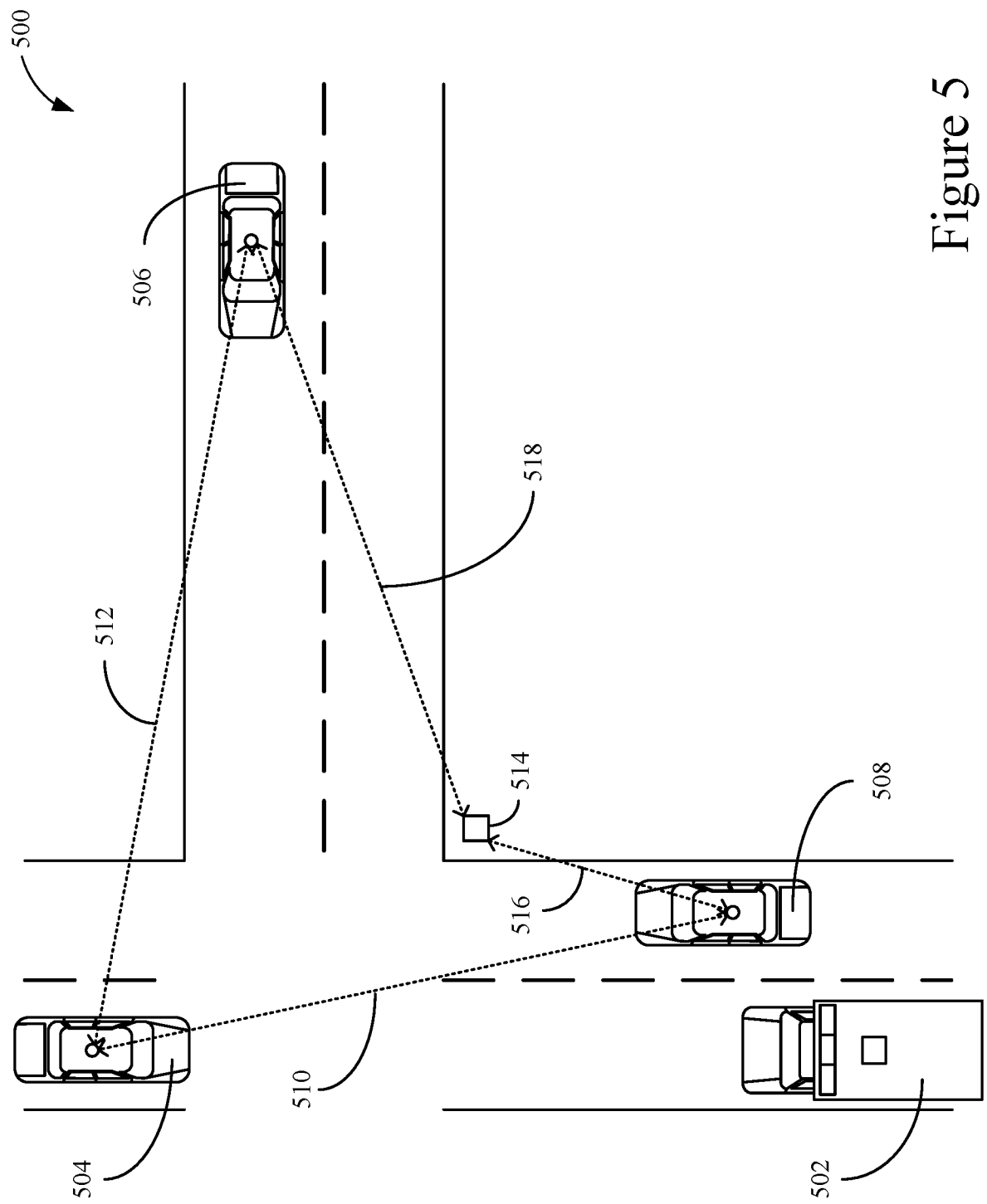
FIG. 5 illustrates an example environment for communicating the presence of an ambulance to another vehicle in the environment.

FIG. 5 illustrates an example environment 500 for communicating the presence of an ambulance 502 to the vehicle 506. The vehicle 508 may detect the ambulance 502. For example, the ambulance 502 may broadcast an emergency signal indicating the presence of the ambulance 502. In another example, a LIDAR device or other sensors of the vehicle 508 may sense the ambulance 502, and the vehicle 508 may identify the ambulance 502 as an emergency vehicle.

In some examples other than an ambulance 502, the vehicle 508 may detect persons in the environment that may warrant other vehicles to alter their navigation or be notified of such persons. For example, the vehicle 508 may detect one or more bicyclists in a lane, children playing near the street, children or other pedestrians crossing the street (such as before or after school), etc. In other examples, the vehicle 508 may detect a stalled car, minor traffic accident ("fender bender"), road blockage, or other traffic situation that may warrant other vehicles altering their navigation or be notified of such accident. Such scenarios may warrant that vehicles reduce their speed through the area, adjust scanning the environment using one or more LIDAR devices to focus on specific areas, change lanes, e.g., to provide more space to the detected persons, situation, etc.

The vehicle 508 may not be in LIDAR communication range with the vehicle 506. For example, LIDAR communications may be based on LoS, and the vehicle 506 may be obstructed or otherwise occluded by a building to prevent the vehicle 508 from communicating directly with the vehicle 506. In some implementations, the vehicle 508 may use one or more vehicles and/or infrastructure to perform LIDAR communication with the vehicle 506 (e.g., to communicate "around a corner"). For example, the vehicle 508 may use LIDAR communications 510 with vehicle 504 to indicate the presence of the ambulance 502. In addition, or in the alternative, the vehicle 508 may communicate via LIDAR communications 516 with a stand 514 to indicate the presence of the ambulance 502.

While FIG. 5 illustrates direct LoS communications between LIDAR devices (510, 512, 516, and 518), LoS communications between LIDAR devices may include one or more signal reflections off of surfaces. For example, a focused beam of optical signals from a transmitting LIDAR device may be intentionally reflected off one or more building walls, signs, or other objects in the environment 500, and the reflections may be received by a receiving LIDAR device. If the beam is sufficiently focused, the transmission includes a sufficient transmission power, and the one or more surfaces have a sufficient reflectivity, the reflections received by the receiving LIDAR device may be processed to determine the communications sent by the transmitting LIDAR device (such as a notification of the presence of the ambulance 502). In this manner, LIDAR devices may communicate with one another without a direct LoS. In this specification, LoS may include direct LoS or indirect LoS (which may include one or more reflections).

The vehicle 504 or the stand 514 may be configured to indicate the presence of the ambulance 502 or other traffic situation to other vehicles and infrastructure within LIDAR communication range. For example, the vehicle 504 may use LIDAR communications 512 to indicate the presence of the ambulance 502. In another example, the stand 514 may use LIDAR communications 518 to indicate the presence of the ambulance 502. In the example, indicating the presence of the ambulance 502 may include two hops to reach vehicle 506 from vehicle 508 (e.g., via LIDAR communications 510 and 512 or via LIDAR communications 516 and 518).

In some implementations, the indication of an emergency vehicle (or other notifications) may be propagated for a defined number of hops or for a defined distance. In this manner, notifying other vehicles of the presence of an emergency vehicle is localized to an area around the emergency vehicle or traffic situation. In some examples, the vehicle 508 may also determine a trajectory, route, or other information of the ambulance 502 and indicate such information to the vehicle 504 or the stand 514. The distance or number of hops to propagate the indication may, e.g., increase in the direction of the route (or, conversely, decrease in the direction opposite of the route). If the vehicle 506 is an autonomous vehicle, the vehicle 506 may proactively pull to the side of the road, stop, change lanes, or alter its route in response to receiving the indication of the presence of the ambulance 502 or other traffic situation. In some other implementations, the vehicle 506 may provide a visual or audible notification to the driver (and/or passengers) to indicate the presence of the ambulance 502 or traffic situation. For example, a vehicle's speakers or a display may notify the driver and/or passengers of the presence of the ambulance 502 or traffic situation.

Another example notification may be of available parking spaces in a parking lot or garage. In some implementations, an entry gate to the parking garage may communicate available spaces to an entering vehicle via LIDAR communication. If the vehicle is an autonomous vehicle, the vehicle may be assigned a parking space and automatically proceed to and park in the space. In this manner, the parking garage or lot may efficiently organize the parking of vehicles entering and exiting. In some other implementations, the entry gate may indicate available parking spaces to the vehicle, and the vehicle may notify the driver and/or passengers of the locations of available spaces. For example, the vehicle may display a map of the parking garage and indicate the locations of the available spaces on the displayed map. The driver and/or passenger may be notified before the vehicle enters the parking garage (e.g., as the vehicle approaches the garage), and the driver and/or passenger may select which spaces are preferred.

As noted above, a further example notification may be of a traffic accident or other obstructions to traffic. The notification may be propagated via LIDAR communication to vehicles preceding the obstruction, and the vehicles may determine alternate routes and/or notify the driver and/or passengers of a possible delay based on the received notification. Other suitable example notifications may also be transmitted via LIDAR communications, and the present disclosure is not limited to the above examples.

Limited Access Area

Another use case for LIDAR communications is to limit access of defined areas. Some areas may be limited to specific vehicles or vehicle types. For example, a hospital ambulance entrance may be limited to ambulances. In another example, handicap parking spaces may be limited to vehicles including a handicap tag. In a further example, HOV lanes may be limited to vehicles including, e.g., 3 or more passengers. In another example, portions of a city center may be limited to autonomous vehicles, low emission or zero emission vehicles, taxis, or other specific types of vehicles. In a further example, a company parking garage may be limited to employee vehicles or vehicles with security clearance.

LIDAR communications may be used to indicate restrictions on specific areas and grant access to such areas for specific vehicles. In some implementations, a LIDAR device for the area (such as an entry gate, stand, or other infrastructure) may transmit to an approaching vehicle the restrictions for the area. The vehicle may then communicate (via its own LIDAR device) the necessary authentication to the LIDAR device, indicating that the vehicle is approved for the area. The vehicle may then be allowed to enter and navigate the area (such as a gate opening or the vehicle otherwise being granted access to the area). In some other implementations, the vehicle may store the qualifications required for the area. In this manner, the vehicle may preemptively communicate its credentials to a LIDAR device to gain access. For example, as an ambulance approaches an ambulance entrance at the hospital, the ambulance may use a LIDAR device to identify itself as an ambulance to gain entrance.

Access restrictions to an area may change over time. For example, HOV lanes may be restricted only during designated rush hours. In another example, city centers may be restricted to zero emission vehicles when smog levels are above a threshold. In a further example, areas around an accident or where police or emergency responders are needed may be restricted to such police or emergency responder vehicles. Since LIDAR communications do not require a centralized network, changes to access restrictions may be more quickly enacted and provided to vehicles than, e.g., remotely coordinating and attempting to establish access parameters for an area via other communications. In some examples, the vehicle may notify a driver and/or passengers that the vehicle is about to enter a restricted area. In this manner, the driver, passengers, or vehicle itself may adjust the route to navigate around the restricted area.

In another implementation, areas may include different tolls or charges based on the time of day, the day of the week, the amount of congestion in the area, special events, etc. LIDAR communications may be used to communicate such tolls or charges to the vehicle before the vehicle enters the area. The driver and/or passengers may then determine (or the vehicle may automatically determine) to enter the area based on the information. For example, some roads include hot lanes where the price to enter such lane is based on the time of day and congestion on the road. The driver and/or passengers may be notified of the price for entering the hot lane and thus decide whether to enter. Alternatively, the vehicle may be configured to enter the hot lane based on, e.g., if the price is less than a threshold amount or a priority of the ride. For example, if an expectant couple is travelling to the hospital, the priority of the ride may be set to override any price constraints regarding the hot lanes. Other suitable restriction use cases may exist, and the present disclosure is not limited to the provided examples.

Object Visualization or Rendering

Another use case for LIDAR communications is to provide rendering or visualization information. As described regarding FIG. 3, a packet may include "RENDER_DESCRIPTION" or "RENDER_IDENTIFICATION" information for rendering or visualizing a vehicle (or infrastructure, such as a stand 408 in FIG. 4). Rendering or visualizing objects in a vehicle's environment may be limited to the LoS of LIDAR devices coupled to the vehicle. As a result, surfaces not in the LoS of the LIDAR devices may not be detected and rendered.

Figure 6B:
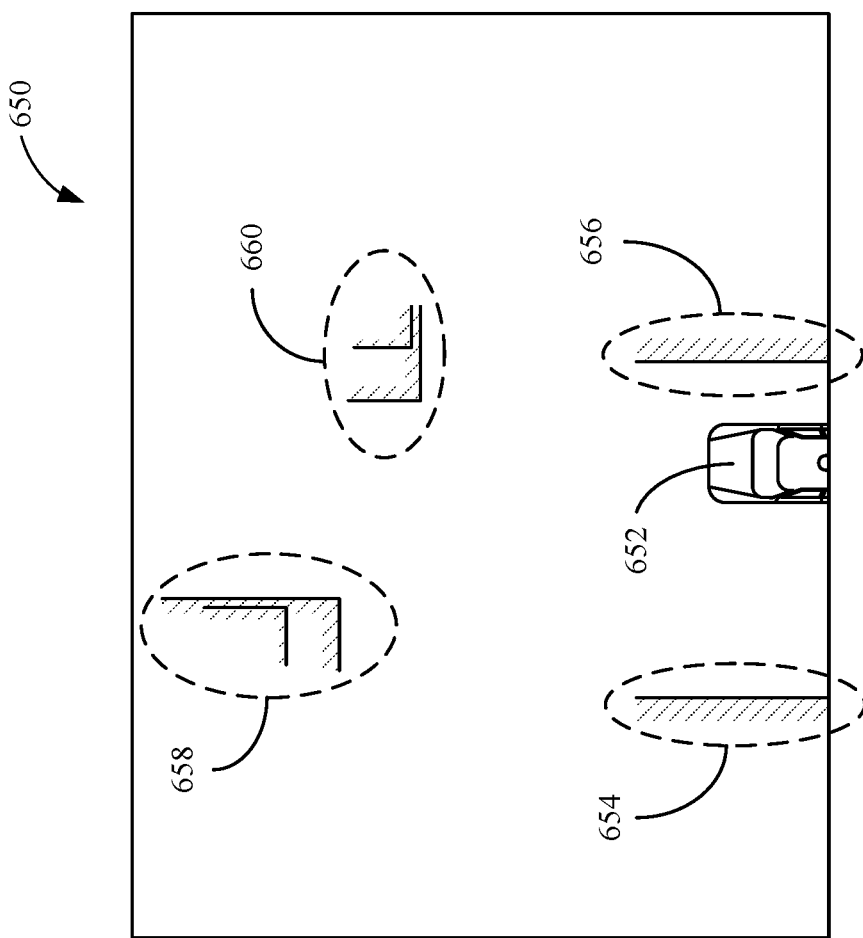
FIG. 6B illustrates an example rendering of the environment of the vehicle as sensed by a LIDAR device.
Figure 6A:
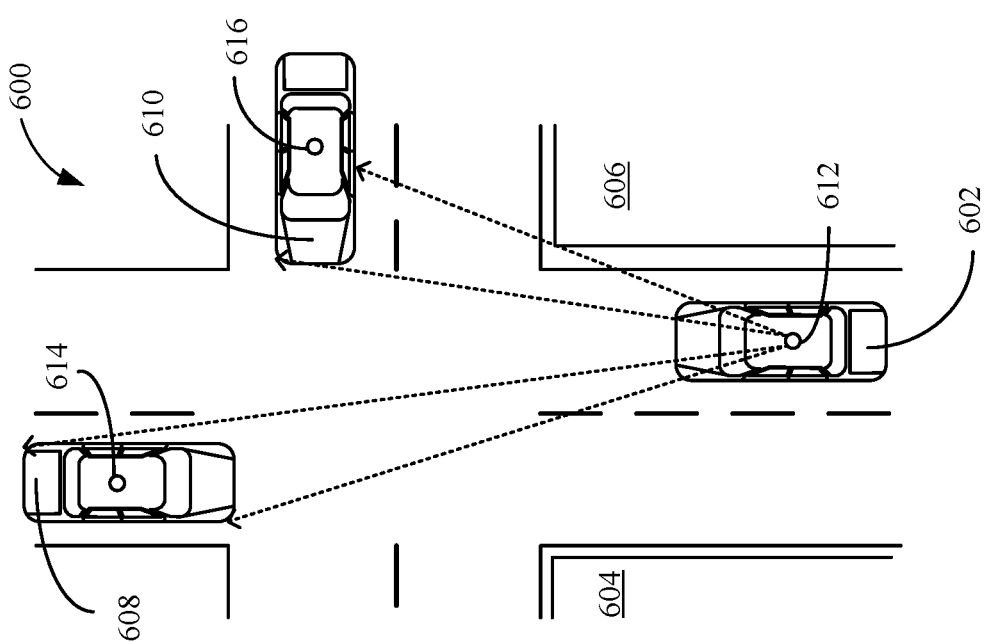
FIG. 6A illustrates an example environment of a vehicle.

FIG. 6A illustrates an example environment 600 of the vehicle 602. The environment 600 includes buildings 604 and 606 and vehicles 608 and 610. As illustrated, the view of the vehicle 608 from the perspective of a LIDAR device 612 of the vehicle 602 includes the front and driver side surfaces of the vehicle 608. The view of the vehicle 610 from the perspective of the LIDAR device 612 is occluded by the building 606. As a result, the view of the vehicle 610 includes the front surfaces and only a portion of the driver side surfaces. Additionally, the view of the buildings 604 and 606 from the perspective of the LIDAR device 612 are the surfaces facing the vehicle 602. The LIDAR device 612 may collect information regarding the depths of surfaces within the view of the LIDAR device 612, and the vehicle 602 may visualize or render the environment 600 including the detected surfaces. A vehicle visualizing or rendering an environment, as used herein, may include one or more of: the vehicle or infrastructure providing, to a display coupled to the vehicle or infrastructure (such as a tablet communicably coupled to a processing system of the vehicle, an in-dash entertainment system coupled to the processing system of the vehicle, a display remote to the vehicle, etc.), instructions for rendering at least a portion of the environment on the display; or the vehicle rendering at least a portion of the environment on an integrated display (such as via an integrated entertainment system in the center console of a vehicle). As used herein, a specific vehicle or infrastructure performing one or more operations (such as a vehicle visualizing or rendering an environment) may refer to a device or system coupled to the vehicle or infrastructure performing the operations (such as generating a rendering to be displayed, and providing the rendering to a display coupled to the vehicle or infrastructure).

FIG. 6B illustrates an example rendering 650 of the environment 600 as sensed by the LIDAR device 612. As described above, the example rendering 650 may be displayed on an integrated display of a vehicle or a display coupled to a processing system of the vehicle. The rendering 650 includes renderings of a surface 654 corresponding to the building 604, a surface 656 corresponding to the building 606, surfaces 658 corresponding to vehicle 608, and surfaces 660 corresponding to vehicle 610. The example rendering 650 also includes a representation 652 of the vehicle 602 to provide perspective. For example, the representation may be an icon, stock image, block, or other saved representation of the vehicle to be used for rendering.

The example rendering 650 is simplified to explain aspects of the disclosure, and the rendering 650 may include additional information or details. For example, the lines or markers in the road may be reflective and thus sensed via LIDAR. In another example, additional features of the buildings 604 and 606 and vehicles 608 and 610 within the LoS of the LIDAR device 612 may be sensed via LIDAR. While the example rendering 650 is illustrated as two dimensional from a bird's eye view, the rendering may be any suitable orientation or from any suitable perspective. For example, the rendering may be a three dimensional point cloud from the perspective of the LIDAR device 612, a two dimensional view of the environment from the perspective of the LIDAR device 612, or any other suitable rendering.

The example rendering 650 may be provided by the vehicle 602 to a driver and/or passenger via a vehicle display. For example, the example rendering 650 may be displayed on an integrated display of a vehicle, or the vehicle may provide instructions for rendering to a display coupled to a processing system of the vehicle. As illustrated in the example rendering 650, depth information may not be determined for hidden surfaces of the objects and buildings. For example, the rendering 650 does not include information for the passenger side and rear surfaces of the vehicle 608, does not include information for the passenger side, rear, and a portion of the driver side surfaces of the vehicle 610, and does not include information for sides of the buildings 604 and 606 not directed to the vehicle 602.

In some implementations, another LIDAR device may transmit to the vehicle 602 rendering information for one or more objects in the environment 600. For example, the LIDAR device 614 of the vehicle 608 may transmit information regarding the vehicle 608 for rendering, and the LIDAR device 616 of the vehicle 610 may transmit information regarding the vehicle 610 for rendering. In some implementations, the dimensions of shapes for rendering a vehicle may be transmitted. For example, the dimensions of one or more rectangles for rendering the vehicle 608 in the rendering 650 may be transmitted from the LIDAR device 614 to the LIDAR device 612. Dimensions of one or more rectangles for rendering the vehicle 610 in the rendering 650 may be transmitted from the LIDAR device 616 to the LIDAR device 612. Other features regarding rendering the vehicle 608 and the vehicle 610 may also be transmitted. Example features include a texture, such as a color, a shading, a highlight, etc. for the vehicle rendering.

In some other implementations, the LIDAR devices 614 and 616 may transmit an identification of the respective vehicle. For example, the LIDAR device 614 may transmit information about the make and model of the vehicle 608, a vehicle identification number of the vehicle 608, a license plate number of the vehicle 608, whether the vehicle is part of a specific fleet of vehicles (such as the same vehicle fleet as the vehicle 602), a unique identifier within the fleet of vehicles, or other identifying information.

The vehicle 602 (or a memory coupled to a display to display the rendering) may store rendering information for specific vehicles, and the vehicle 602 may use the vehicle identification to look up the stored rendering information for the specific vehicle. For example, a vehicle memory (or other memory) may store rendering information for a plurality of makes and models of vehicles (including the vehicle 608 and the vehicle 610), and such rendering information may be retrieved and used to enhance the rendering 650 for the environment 600. If the rendering 650 is to be displayed on a display coupled to the vehicle 602, the vehicle 602 may provide the rendering information retrieved from a vehicle memory, or the vehicle 602 may provide information for identifying the rendering information in an external memory (such as providing information regarding the make and model to an entertainment system coupled to the vehicle). Example rendering information may include a stock image or drawing of the specific vehicle. In some examples, the rendering information may be used to replace or be combined with corresponding portions of the rendering 650. In some other examples, adjusting a rendering may include highlighting an object rendering. For example, the rendering may be updated to notify a driver or passenger of an emergency vehicle or situation in the vehicle's environment.

Figure 6D:
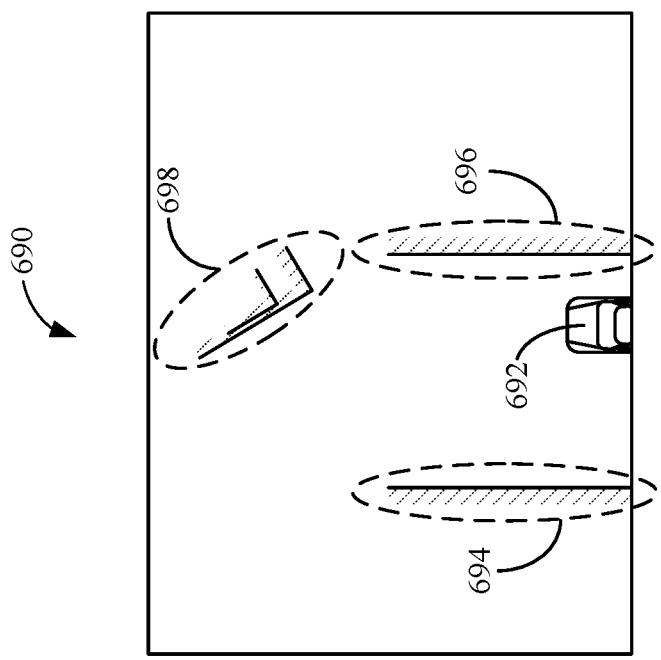
FIG. 6D illustrates an example rendering of the environment of the vehicle in FIG. 6C as sensed by a LIDAR device.
Figure 6C:
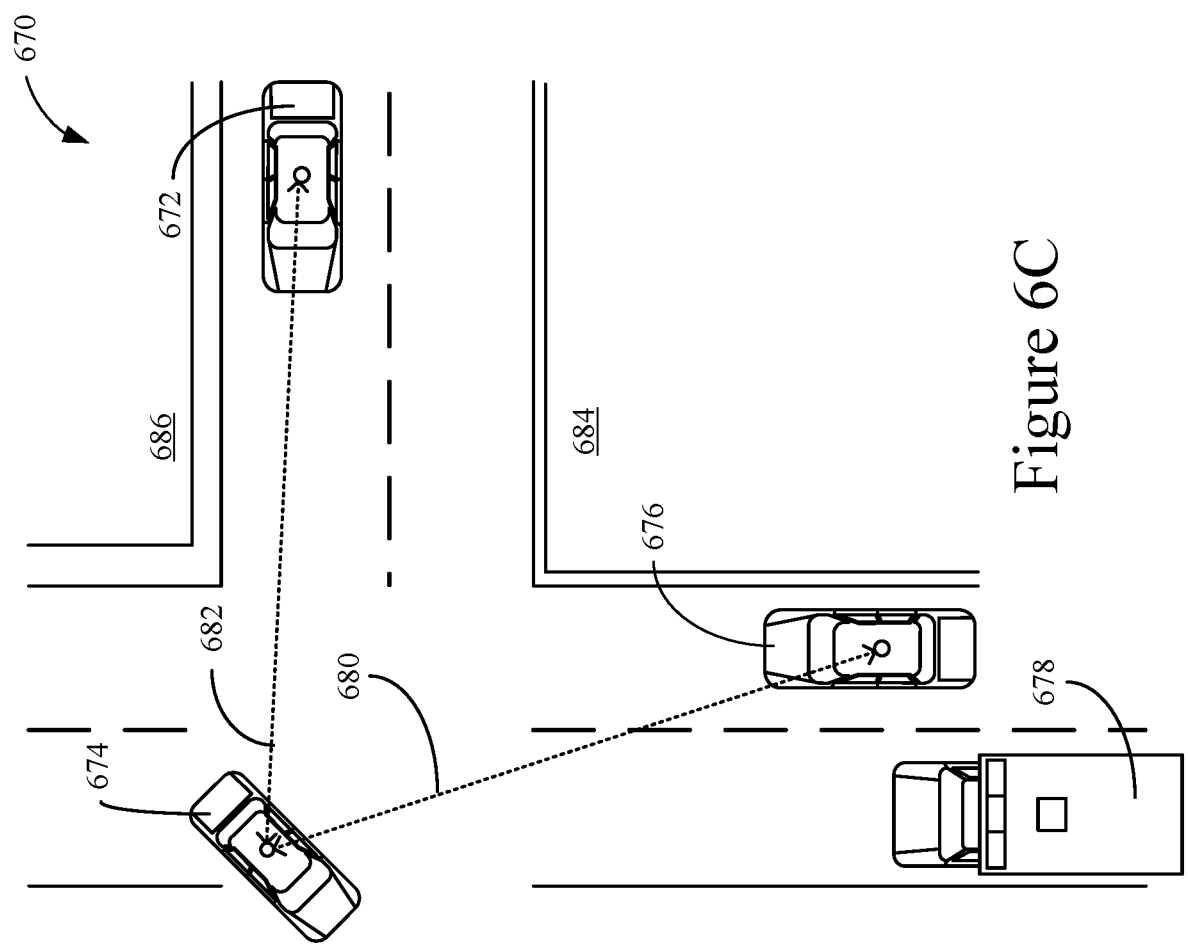
FIG. 6C illustrates an example environment of a vehicle including an emergency vehicle.

FIG. 6C illustrates an example environment 670 of the vehicle 672. The example environment 670 includes buildings 684 and 686 and vehicles 674 and 676. The environment 670 also includes emergency vehicle 678. FIG. 6D illustrates an example top down rendering 690 of the environment 670 of the vehicle 672 in FIG. 6C. The rendering 690 includes renderings of a surface 694 corresponding to the building 684, a surface 696 corresponding to the building 686, and surfaces 698 corresponding to vehicle 674. The example rendering 690 also includes a representation 692 of the vehicle 672 to provide perspective. Vehicle 676 and emergency vehicle 678 may not be within a LoS of a LIDAR device coupled to the vehicle 672. As a result, the rendering 690 may not include a rendering of the vehicle 676 or a rendering of the emergency vehicle 678.

Figure 7:
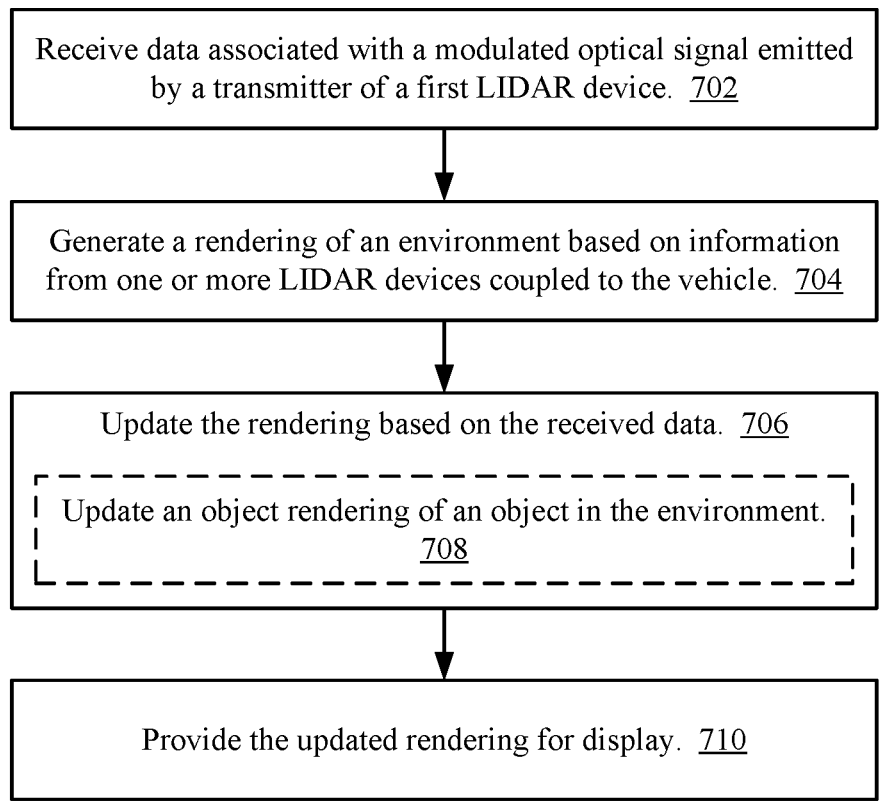
FIG. 7 shows a flow chart depicting an example operation for adjusting a rendering of an environment of a LIDAR device.

FIG. 7 shows a flow chart depicting an example operation 700 for adjusting a rendering of an environment of, e.g., a vehicle, a LIDAR device, an infrastructure, etc. The example operation 700 is described below with respect to the vehicles 602 and 672 in FIGS. 6A and 6C for illustrative purposes only. One of ordinary skill in the art will recognize that the example operation 700 may be performed by any suitable device (such as a control device coupled to a vehicle), infrastructure, and/or vehicle according to various implementations, and the example operation 700 described herein may be performed with additional steps, with fewer steps, with steps in a different order, with steps in parallel, or any combination thereof. Herein, the vehicle 602 performing one or more steps may mean a processing system coupled to the vehicle performing one or more steps, a processing system integrated into the vehicle 602 performing one or more steps, or other suitable embodiments for performing the described method. For example, a control device separate from the vehicle may be installed or otherwise coupled to the vehicle. Such control device may also be coupled to the one or more LIDAR devices, coupled to a display (for rendering or displaying other information), and/or coupled to one or more other input/output components (such as a speaker, keypad, etc.). The vehicle 602 performing one or more steps may mean in some implementations that the control device performs one or more steps.

Beginning at 702, the vehicle 602 may receive data associated with a modulated optical signal emitted by a transmitter of a first LIDAR device. For example, a device may be coupled to the LIDAR device 612, and a modulated optical signal may be transmitted from the LIDAR device 614 or the LIDAR device 616 to the LIDAR device 612. The modulated optical signal includes an optical carrier signal modulated to include a data signal. The LIDAR device 612 or the device coupled to the LIDAR device 612 may extract the data signal and determine the data included in the data signal.

The vehicle 602 may also generate a rendering of the vehicle's environment based on information from one or more LIDAR devices coupled to the vehicle (704). For example, the vehicle 602 may include a processing system to receive measurements from the LIDAR device 612 when the LIDAR device 612 is in a detection mode. The measurements may be used to generate a rendering, such as a point cloud, a depth map, or other suitable representations of the environment 600. For example, the processing system may generate the example rendering 650 for the environment 600 (or the example rendering 690 for the environment 670) based on received measurements from the LIDAR device 612 or other LIDAR devices coupled to the vehicle, and the rendering may include representations of surfaces detected in the environment 600 (or environment 670).

Based on the received data, the vehicle 602 may update the rendering (706). For example, the vehicle 602 may update a rendering of an object in the environment (708). In some example implementations, the vehicle 602 may receive an object identifier in the received data. For example, the LIDAR device 612 in a communication mode may receive, from the LIDAR device 614 via a modulated optical signal, a packet including an identifier for the vehicle 608. The identifier may be a specific vehicle ID in the packet, a vehicle identification number, a make and model of the vehicle, or another suitable identifier.

The vehicle 602 may determine rendering information for the object based on the identifier. Example rendering information may include dimensions of one or more shapes in rendering the object (such as one or more rectangles or other shapes in rendering a vehicle), a representative image of the object (such as a representative drawing of a vehicle based on, e.g., the type of vehicle, make and model of the vehicle, etc.), a stock image of the object (such as a stock picture of a vehicle), or a texture to be applied to a rendering of the object (such as a texture to be applied to the rendering of a vehicle). Rendering information may also indicate whether an object rendering is to be highlighted or adjusted (such as a change in size, dimensions, stretched, etc.). In some implementations, if the vehicle 602 receives an identifier of the vehicle 608 (such as a make and model), the vehicle 602 may scan a database indexed by the identifier (such as makes and models) associated with rendering information (such as reference images of the vehicles, stored dimensions of the vehicles, highlighting information if an emergency vehicle, etc.) to determine the rendering information for the vehicle 608 (such as a stored image of the make and model of the vehicle 608). The vehicle 602 may then update the object rendering based on the determined rendering information. For example, the rendered surfaces 658 in the rendering 650 may be combined with a stored image or other rendering information for the vehicle 608 to update the rendering 650. In another example, the rendered surface may be highlighted. In another example of updating an object rendering, an object rendering may be added to the rendering of the environment. For example, a rendering of the vehicle 676 and/or a rendering of the emergency vehicle 678 may be added to the rendering 690.

In some other implementations, a LIDAR device may be configured to transmit a data signal including a specific description of how an object should be rendered. For example, the LIDAR device 614 of the vehicle 608 may transmit the rendering model, the texturing, and any other features for rendering the vehicle. In this manner, a memory including a look-up table, database, etc. may not be used in determining the rendering information for the object in updating the rendering of the environment.

Referring back to FIG. 7, after updating the rendering, the vehicle 602 may provide the updated rendering for display (710). For example, a control device coupled to the vehicle 602 may provide the updated rendering to a display coupled to the vehicle 602, and the display may display the updated rendering to a driver and/or passenger. In another example, the rendering may be provided to a remote display for others to be apprised of the environment of the vehicle 602.

FIG. 8 illustrates an example rendering 800 of the environment 600 in FIG. 6. The rendering 800 may be an example of an adjusted rendering of rendering 650 in FIG. 6B based on rendering information for the vehicles 608 and 610. For example, the vehicle 602 may store representative images (such as a stock image, line drawing, etc.) or other suitable rendering information for the received identifiers for the vehicles 608 and 610. The LIDAR devices 614 and 616 may transmit vehicle identifiers to the LIDAR device 612, and the vehicle 602 may use the received vehicle identifiers to determine the rendering information for the vehicles 608 and 610 to adjust the rendering 650.

The rendered surfaces 658 associated with the vehicle 608 may be combined with the determined rendering information for the vehicle 608 (such as a stock image or stored drawing for the vehicle 608). For example, an image of the vehicle 608 may be aligned with the rendered surfaces 658 (such as by sizing and/or orienting the image of the vehicle 608 to align with the rendered surfaces 658). In the example rendering 800, object 808 corresponds to the adjusted rendering of the vehicle 608. Similarly, object 810 in the rendering 800 corresponds to the adjusted rendering of the vehicle 610.

While not shown, other objects that may be represented in the rendering 650 may include infrastructure, buildings, road markings, pedestrians, or other non-vehicles whose rendering may be adjusted. In some examples, a LIDAR device coupled to a vehicle may transmit information regarding an object in the environment other than the vehicle. For example, one or more LIDAR devices of the vehicle 608 (such as the LIDAR device 614) may be used to determine depths of objects in the environment of the vehicle 608, and one or more LIDAR devices of the vehicle 610 (such as the LIDAR device 616) may be used to determine depths of objects in the environment of the vehicle 610. In one example, each vehicle 602, 608, and 610 may generate a rendering based on the measurements provided by the LIDAR devices of the respective vehicles. In some implementations, the vehicles 602, 608, and 610 may share the LIDAR measurements with one another (via LIDAR communications), and the combined LIDAR measurements may be used by the vehicle 602 for generating a more comprehensive rendering of the environment 600 than rendering 650.

In some implementations, any suitable updated rendering may be displayed on a display of the vehicle 602. For example, an updated rendering may be generated for an area of the environment not yet within range or LoS of the LIDAR devices for the vehicle 602. The vehicle 610 may detect objects near the street behind the vehicle 610 (e.g., using the LIDAR device 616), which may be used for rendering the environment 600 not within the field of view of the vehicle 612. The vehicle 610 may transmit the rendering information for at least a portion of that environment (such as rendering information for pedestrians, bicyclists, parked cars, traffic cones, obstructions, obstacles, etc.) to the vehicle 602. In this manner, the vehicle 602 may use the rendering information to include additional information about the environment 600 on the right side of the rendering 650 (which is blocked by the building 606 from the field of view of the LIDAR device 612 for the vehicle 602). In some aspects, rendering information may be shared among a plurality of vehicles and infrastructure, and the rendering for a specific vehicle (such as the vehicle 602) may include areas well beyond the vehicle. For example, rendering information about the environment of a vehicle multiple hops from the vehicle 610 may be transmitted through the hops to the vehicle 610 and then to the vehicle 602. The rendering information may then be used by the vehicle 602 to expand the area covered by the rendering generated by the vehicle 602.

In addition to updating a rendering, received data may be used for navigation or other automated operations of an autonomous vehicle. For example, the updated renderings may indicate additional obstructions or obstacles, and the vehicle may thus navigate (such as update its navigation) to avoid the additional obstacles during operation. Referring back to the renderings 650 and 800 in FIGS. 6B and 8, respectively, the rendering 650 does not illustrate the rear portion of the vehicle 610, but the updated rendering 800 illustrates all of the vehicle 610. If the route of vehicle 602 would be determined to collide with the end of vehicle 610 determined based on the received data, the navigation of the vehicle 602 may be updated to avoid vehicle 610. In another example, a driver and/or passenger may be notified of a possible collision or obstruction based on the updated rendering. For example, the updated rendering including the obstructions or obstacles may be displayed to the driver and/or passengers, or the driver and/or the passengers otherwise may be notified of the obstructions or obstacles. In this manner, the occupants of the vehicle may be apprised of changes in a route, the slowing of the vehicle, or other changes in navigation of an autonomous vehicle before the obstructions or obstacles are in view of the occupants. Additionally, or alternatively, a dispatcher or central office for a fleet including the vehicle may be notified of the obstructions or obstacles to explain the reasons for adjusting the navigation of the vehicle.

In addition to updating the rendering 650 to include a model or other representative image of a vehicle (or another object in the environment), the rendering 650 may be updated to include a texture for the model. For example, renderings of vehicles within the same fleet may be adjusted to have a similar texture to indicate belonging to the same fleet.

Figure 9A:
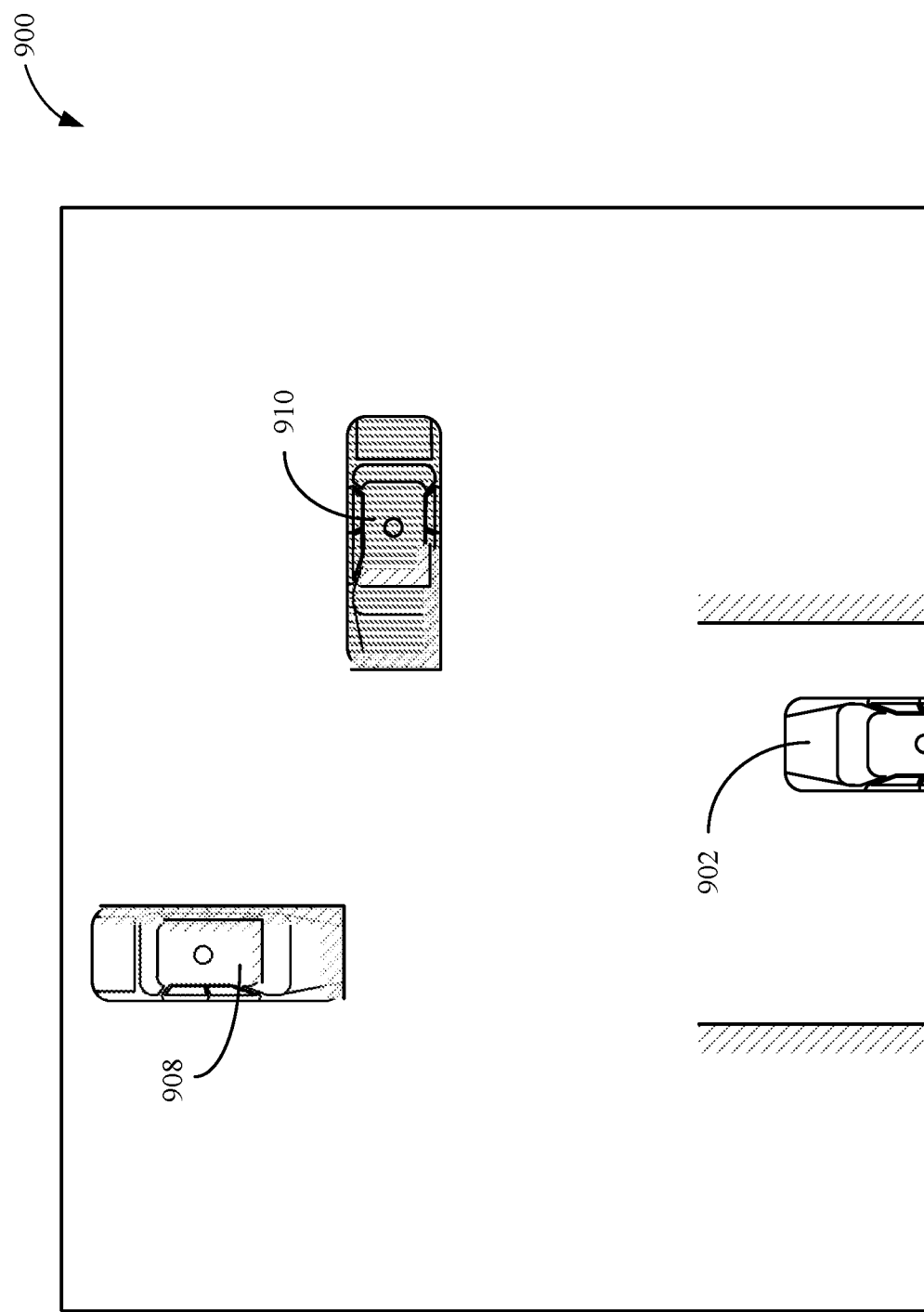
FIG. 9A illustrates an example rendering of the environment in FIG. 6A where the two vehicles in the environment belong to the same fleet.

FIG. 9A illustrates an example rendering 900 of the environment 600 in FIG. 6A where the vehicle 608 and the vehicle 602 belong to the same fleet. As shown, objects 902 and 908 in the rendering 900 may be textured (such as shaded) similarly. Object 910, corresponding to the vehicle 610 that is not part of the same fleet, may be textured differently than objects 902 and 908. For example, object 910 may include a different shade than objects 902 and 908. Objects, such as infrastructure, buildings, roads, vehicles, etc. may each be textured differently according to the type of object. For example, stands may be rendered using the same texture, emergency vehicles may be rendered using the same texture, etc. In this manner, a driver and/or passenger may easily identify similar objects in the environment based on the textures in the displayed rendering. In some implementations, updating a rendering may include highlighting an object rendering. For example, renderings of emergency vehicles may be highlighted to notify the occupants of the vehicle of the presence of an emergency vehicle. Similarly, construction zones, safety zones, or other areas of the environment may be highlighted to notify the vehicle occupants of their presence in the environment.

Figure 9B:
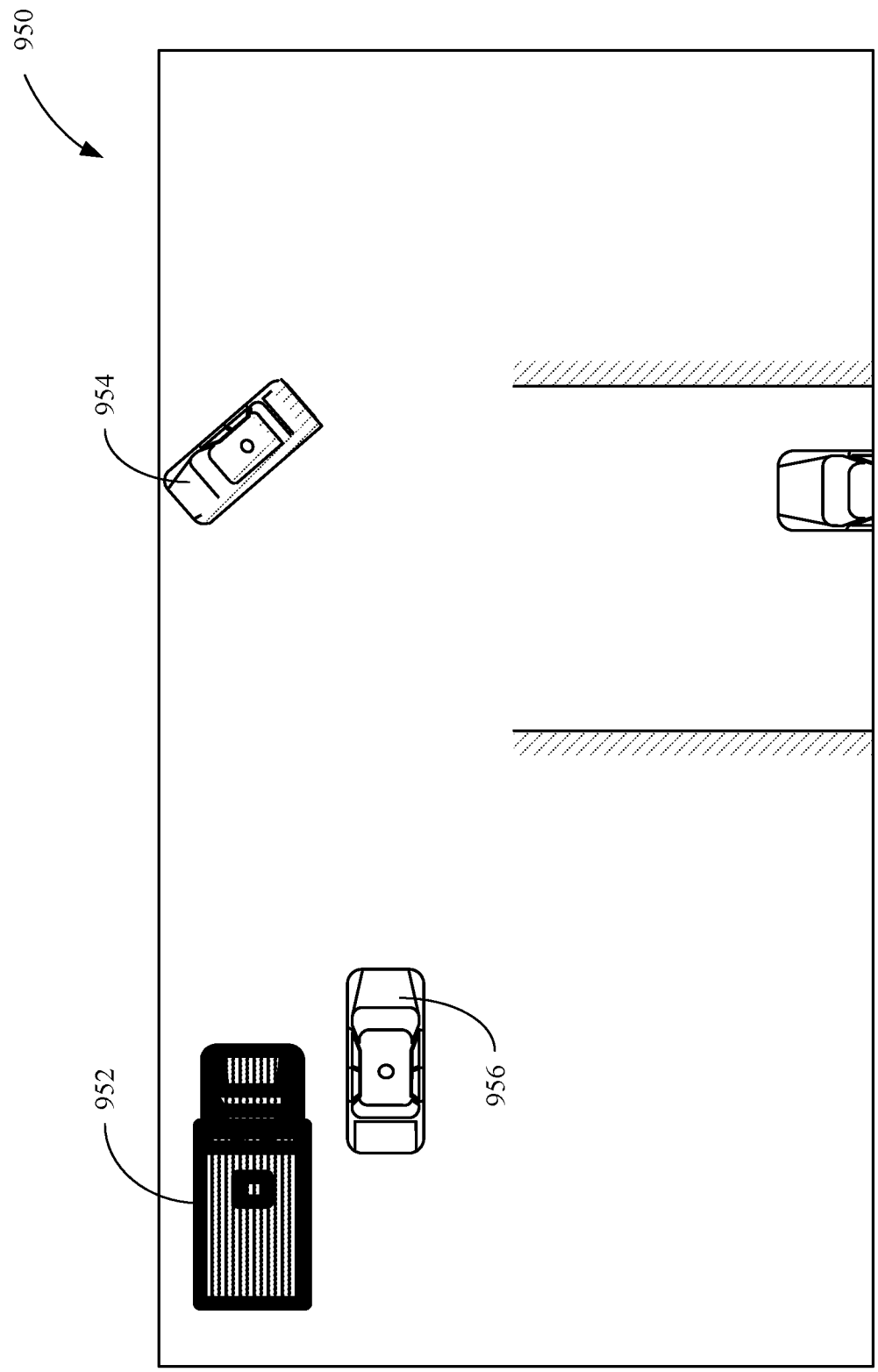
FIG. 9B illustrates an example rendering of the environment in FIG. 6C where the environment includes an emergency vehicle.

FIG. 9B illustrates an example updated rendering 950 of the environment 670 (FIG. 6C). The updated rendering 950 includes a rendering 952 of the emergency vehicle 678. The rendering 952 may be highlighted to indicate that the vehicle 678 is an emergency vehicle. The rendering 952 may also include a representative image 954 included for the vehicle 674 and a representative image 956 included for the vehicle 676 not originally included in the rendering 670.

Referring back to the environment 670 in FIG. 6C, vehicle 676 and emergency vehicle 678 may be occluded from the LoS of LIDAR devices coupled to vehicle 672. As a result, the rendering 690 in FIG. 6D (based on measurements from the LIDAR devices) does not include renderings of the vehicle 676 and the emergency vehicle 678. In some implementations, a LIDAR device coupled to the vehicle 672 may receive reflections of a modulated optical signal from a LIDAR device coupled to the vehicle 676 or the emergency vehicle 678. The modulated optical signal may include data indicating the presence of the emergency vehicle 678. The data may also indicate other information regarding the emergency vehicle, such as the type of emergency vehicle, whether the emergency vehicle 678 is responding to an emergency, and/or the path of travel, speed, etc. of the emergency vehicle. The data may also include information about other vehicles or objects. For example, the data may indicate a presence of the vehicle 676.

In some other implementations, the vehicle 672 may receive data regarding the emergency vehicle 678 from an intermediate device. The vehicle 676 may sense the presence of the emergency vehicle 678 (such as via a LIDAR device coupled to the vehicle 676). The vehicle 676 may transmit data regarding the emergency vehicle 678 to the vehicle 674 within LoS via a modulated optical signal 680. The vehicle 674 may then transmit the data regarding the emergency vehicle 678 to the vehicle 672 within LoS via a modulated optical signal 682. While one intermediate node for transmitting the data is shown, any number of hops may be performed by the data. When the vehicle 672 receives the data regarding the emergency vehicle 678 (and the data regarding the vehicle 676), the vehicle 672 may update the rendering 690 to fill-in portions of the occlusions caused by the building 684 as well as highlight or otherwise indicate the presence of emergency vehicle 678. In addition or alternative to highlighting an emergency vehicle, the vehicle 672 may otherwise notify a driver and/or passenger by e.g., flashing the display, providing an audible notification, applying a special texture to the rendering, and/or providing a textual notification on the display. While the examples in FIGS. 6C, 6D, and 9B are described with respect to an emergency vehicle (such as an ambulance), the operations may apply to any vehicle, object, or area of interest (such as construction zones, school zones, accident areas, etc.).

In some implementations, rendering information for objects in an environment may be provided via a software as a service (SaaS) model. For example, a unique identifier for an object may be received by the vehicle 602. The vehicle 602 may then communicate with the service (such as via a cellular modem or other communication means) to obtain the rendering information for the object. For example, the vehicle 602 may receive a vehicle identification number of the vehicle 608, and the vehicle 602 may communicate with a remote server storing rendering information for a plurality of objects, including the vehicle 608. The remote server may provide the rendering information for the vehicle 608 in response to the request, and the rendering information may be used by the vehicle 602 to update the rendering.

In some other implementations, the vehicle 602 may store rendering information for objects, and a remote server may provide rendering information of objects not locally stored for the vehicle 602. In addition, or to the alternative, a remote server may be used for updating the locally stored rendering information. For example, when a new make and model of a vehicle is released, rendering information for the vehicle may be created but not yet stored in a memory of the vehicle 602. LIDAR communication may be used to update the locally stored rendering information of vehicle 602 to include the new rendering information. In some implementations, the vehicle 602 may update its stored rendering information when coupled to a stand with a dedicated backhaul (such as the stand 408 in FIG. 4).

Other use cases for LIDAR communications exist, and the present disclosure is not limited to the above examples. For example, a device (such as a vehicle) may include software or firmware that periodically requires updates. A LIDAR device may be used to receive software updates from other devices. For example, a software update to include rendering information for a new make and model of a vehicle may be provided to a first subset of vehicles. Those vehicles may then transmit the update to other vehicles in the environment via LIDAR communications. In this manner, an update may be distributed quickly without requiring all vehicles to connect to a central location (such as a server storing the update). For example, communications between devices (such as vehicles and infrastructure) may be similar to a peer to peer network, and the update may be propagated across devices without requiring a central repository for downloading the update. Another example use case may include audio or video transmission between devices (such as for voice calls, messaging, or videoconferencing).

In general, one or more operations may be based on data received via a modulated optical signal for LIDAR communications. As noted herein, LIDAR communications may be used to provide data for, e.g., affecting navigation of an autonomous vehicle, providing notifications to a driver or passenger, adjusting access to locations, etc.

Figure 10:
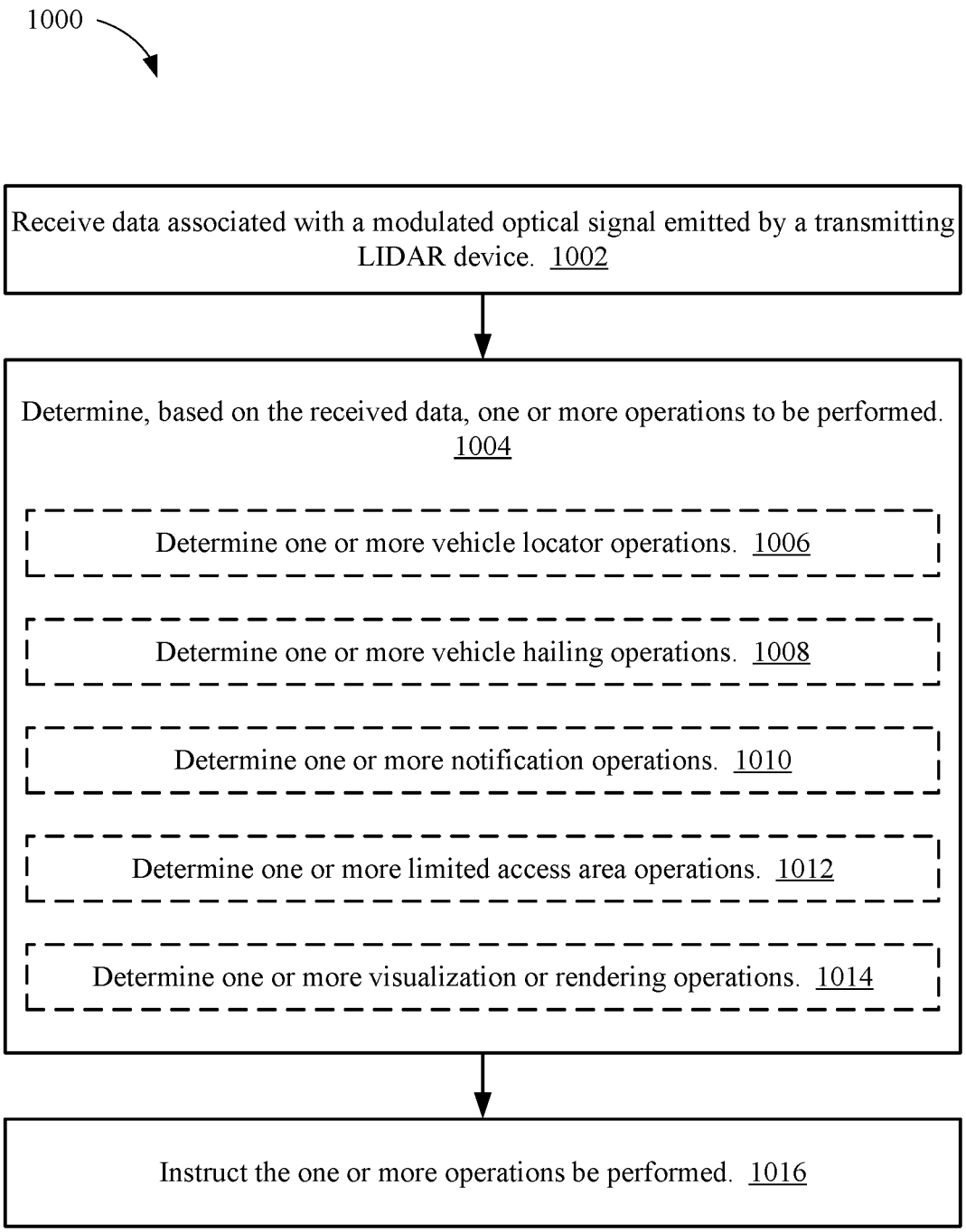
FIG. 10 shows a flow chart depicting an example operation for performing one or more operations based on data received in a transmission from a LIDAR transmitter.

FIG. 10 shows a flow chart depicting an example operation 1000 for performing one or more operations based on data received in a transmission from a LIDAR transmitter. While FIG. 10 is discussed in terms of a device performing one or more operations for the purposes of explaining aspects of the disclosure. The operation 1000 may be performed by a vehicle, infrastructure, a dispatcher or central office coordinating a fleet of vehicles, a processing system (such as an entertainment system) coupled to a vehicle, a suitable control system (such as a control system coupled to the vehicle for Level 4 autonomous driving), etc. The example operation 1000 is not limited to being performed by a specific device or for performing a specific device operation.

Beginning at 1002, a device may receive data that is associated with a modulated optical signal emitted by a transmitting LIDAR device. For example, the device (such as a vehicle, processing system, etc.) may be coupled to a LIDAR device configured to receive a modulated optical signal from a separate transmitting LIDAR device. The receiver of the receiving LIDAR device may receive the modulated optical signal, which may include an optical carrier signal modulated to carry a data signal including the data. The carrier signal may be the signal typically used for detection and ranging. The receiving LIDAR device (or the device coupled to the receiving LIDAR device) may demodulate the modulated optical signal to generate and provide the data provided in the modulated optical signal. In this manner, the device (such as a processing system or vehicle) may receive the data associated with the modulated optical signal. In some implementations, the data may include one or more packets. Referring back to FIG. 3, example packets may include information specific to, e.g., locating a vehicle, accessing a specific area or location with a vehicle, object rendering, etc.

Referring back to FIG. 10, the device may determine, based on the received data, one or more operations to be performed (1004). For example, the device may determine one or more operations based on one or more packets received. In some implementations, the device may determine one or more vehicle locator operations (1006). In one example, if a vehicle receives information in the data that the vehicle is to be located, the vehicle may determine to return to a designated spot (such as a parking space including a stand, as illustrated in FIG. 4) and communicate with the stand (via LIDAR communications) the vehicle's location and current status. In another example, if the device receives information about a missing vehicle and the device recently communicated with the missing vehicle, the device may communicate with a vehicle, infrastructure, a dispatch, etc., the last received location and other information about the missing vehicle. Additionally, or alternatively, the device may propagate the missing vehicle message to other vehicles and devices via LIDAR communications.

In some other implementations, the device may determine one or more vehicle hailing operations (1008). Referring back to FIG. 4, if the stand 408 is a walk-up stand for a fleet of automated taxis, the stand 408 may communicate with a vehicle via LIDAR communications that the vehicle is assigned to a specific client and ride. The vehicle may receive the data from the stand 408 via LIDAR communications between a LIDAR device coupled to the vehicle and a LIDAR device coupled to the stand and located in a separate lot where the vehicle is queued. Based on the received data, the vehicle may approach a space by the stand 408 and communicate, with the stand 408, information regarding the ride or client assigned to the vehicle. The stand 408 may notify the client that the vehicle has arrived so that the client may embark. In another example, the vehicle or device may determine that a driver (such as a taxi driver) is to be notified of a client and/or ride assigned to the vehicle. The taxi driver may approach the client based on the notification in order to begin the ride.

Referring back to FIG. 10, in some further implementations, the device may determine one or more notification operations (1010). In some examples, referring back to FIG. 5, the vehicle 506 may receive data that an ambulance 502 or other emergency vehicle is in the vicinity. The vehicle 506 may pull to the curb, stop, or otherwise adjust the vehicle's operation or navigation to allow the ambulance 502 to safely pass. Additionally, or alternatively, the vehicle 506 or another device may determine to notify a driver and/or passengers of the presence of the ambulance 502. In some other examples, the vehicle 506 or device may determine to indicate the presence of the ambulance 502 to other vehicles, infrastructure, or other devices via LIDAR communications (thus propagating the indication to other vehicles and infrastructure within an area of the ambulance 502).

In another example of notification operations, a vehicle may receive data regarding available parking spaces in a parking garage. The vehicle may therefore drive to and park in one of the available spaces. The vehicle or a device may determine to notify a driver and/or passenger of the available spaces (such as indicating available spaces on a displayed map of the parking garage), etc. Other example notification operations may include updating a route based on a notification of an accident or traffic along the current route, notifying other vehicles of the accident or traffic via LIDAR communications, notifying a driver and/or passenger of changes in the route or traffic conditions, etc.

Referring back to FIG. 10, in some other implementations, the device may determine one or more limited access area operations (1012). For example, if a city center is limited to autonomous vehicles, zero emission vehicles, or other specific types of vehicles, a vehicle may receive data associated with the access restriction from a LIDAR device coupled to the vehicle. The LIDAR device may receive the data in a modulated optical signal transmitted by LIDAR device coupled to infrastructure or another suitable device. For example, a gate, toll booth, stand, etc. may include a LIDAR device to transmit an indication of the access restrictions to the vehicle. The vehicle may determine whether the vehicle is allowed in the area based on the indication. The vehicle may also determine one or more navigation operations to access the area if the vehicle is allowed. For example, an autonomous vehicle may enter a city center if access is limited to autonomous vehicles. Additionally, or alternatively, the vehicle may determine to notify a driver and/or passenger of an approaching limited access area and the limitations for access. In some examples, the driver may determine whether to access the area based on the notification. In some further examples, the vehicle may be notified of a toll or charge for accessing a specific area. For example, a bridge, lane, or area of the city may be associated with an access charge. The vehicle may provide account or other payment information via LIDAR communications before access to infrastructure for the limited area (such as for providing payment to a toll booth before crossing a bridge). In some examples, the driver and/or passenger may be notified of the charge.

Since limitations for an area may change based on present circumstances (such as a time of day, day of the week, current traffic congestion, smog levels, a circumstance requiring limitation of an area to emergency vehicles, etc.), such changes in limitations may be communicated. In response, a vehicle may, e.g., determine to notify the driver and/or passenger of changes in access limitations for the area, to adjust a route to navigate around a newly restricted area, or to notify other vehicles of the changes via LIDAR communications.

Referring back to FIG. 10, in some further implementations, the device may determine one or more visualization or rendering operations (1014). For example, an environment of a vehicle, LIDAR device, infrastructure, or other suitable device may be rendered (such as generating a point cloud, mapping of the environment, depth map, etc.), and the rendering may be displayed to a driver and/or passenger. Referring back to FIGS. 6A and 6B, the vehicle 602 (or another suitable device, such as an entertainment system, processing system, etc. coupled to the vehicle 602) may generate the rendering 650 from data provided by the LIDAR device 612. The vehicle 602 (or other suitable device) may also receive one or more identifiers of the vehicles 608 and 610 in transmissions from the respective LIDAR devices 614 and 616. The vehicle 602 (or other suitable device) may therefore determine rendering information for the vehicles 608 and 610 based on the received identifiers (such as looking up the information in a memory of the vehicle or device, communicating with a remote service to provide rendering information for one or more objects, determining rendering information encoded in the transmission from the respective LIDAR device, etc.). Rendering operations may therefore include using the determined rendering information to update the rendering 650. For example, rendering 650 in FIG. 6B may be updated to rendering 800 in FIG. 8 based on representative images (e.g., models) for the vehicles 608 and 610 used to update the rendering. Other example rendering operations may include applying a defined texture for emergency vehicles, applying similar textures for similar types of objects, applying a unique texture specific to each vehicle or object in the environment and associated with a unique identifier (such as a unique Transmitter ID 302 in FIG. 3), etc. In some examples, the vehicle 602 or other suitable device may determine that the updated rendering of the environment is to be displayed to a driver and/or passenger. Rendering operations may also include contacting a remote service to update a stored database of rendering information, updating the database based on receiving new rendering information (such as for a new make and model of a vehicle), or propagating updates to the rendering information via LIDAR communications with other vehicles or devices in the environment.

Referring back to FIG. 10, the device may then instruct the one or more operations be performed (1016). For example, if one or more rendering operations are determined, the device may instruct a display or another device coupled to the display to display the rendering and display an updated rendering. In another example, if the device is a vehicle and the one or more operations are limited access area operations, the vehicle may instruct one or more vehicle components to navigate the vehicle into or out of the area. The device may also provide instructions for displaying information regarding the limited access area to a driver and/or passenger.

While some of the example processes in the example operation 1000 in FIG. 10 are described from the perspective of a vehicle, any suitable device may perform one or more associated operations. For example, a stand (or processing system coupled to the stand) may perform vehicle locator operations (such as contacting a dispatcher) in response to receiving a LIDAR transmission from a missing vehicle. In another example, a stand may perform vehicle hailing operations (such as notifying a client that the vehicle has arrived) in response to receiving a LIDAR transmission from the hailed vehicle. In another example, a stand may perform notification operations (such as transmitting a notification of an ambulance in the area) in response to receiving a notification in a LIDAR transmission. In a further example, a toll booth or gate may perform limited access area operations (such as changing an access fee or access restrictions for the area) in response to receiving an update in traffic congestion from LIDAR devices for infrastructure or vehicles in the area. As described, the example operation 1000 is not limited to being performed by a specific device (such as a vehicle).

Additionally, while the example operations (such as ride hailing, access restriction, updated rendering, etc.) are described separately, a device may be configured to perform any number and combination of the operations. For example, a device may be configured to update a rendering regarding an emergency vehicle, notify the vehicle occupants of the presence of an emergency vehicle, update an area restricted to the vehicle based on the presence of the emergency vehicle, and update navigation of the vehicle to avoid the restricted area.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Additionally, those of skill in the art will appreciate that the examples are provided for illustrative purposes in explaining aspects of the present disclosure. Aspects of the present disclosure may be performed by any suitable device (such as an autonomous vehicle, a fleet of autonomous vehicles, infrastructure, a control system for a vehicle or infrastructure, an entertainment system coupled to a vehicle, or other devices), and are not limited to specific examples herein.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure. For example, a processing system of a vehicle or other suitable device may include one or more processors and a memory coupled to the one or more processors. The memory may include instructions executed by the one or more processors to cause the device to perform operations as described herein. The processing system may also be coupled to one or more LIDAR devices for LIDAR communication and detection and ranging of surfaces. In some aspects, the processing system may include dedicated hardware, such as one or more integrated circuits, configured to perform one or more operations.

As such, the methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to one or more processors (e.g., directly connected or remotely coupled) such that the one or more processors can read information from, and write information to, the storage medium. In the alternative, the storage medium may be integral to the one or more processors.

In the foregoing specification, the example embodiments have been described with reference to specific example embodiments thereof. It will, however, be evident that various modifications and changes may be made thereto without departing from the broader scope of the disclosure as set forth in the appended claims. For example, while vehicles are illustrated in general as automobiles, any suitable vehicle may be used, such as a motorcycle, drone, aircraft, watercraft, helicopter, etc. Further, a vehicle may include one or more LIDAR devices, or the vehicle may be coupled to a LIDAR device manufactured separately from the vehicle. The vehicle may also include one or more processing systems, entertainment systems, control systems, etc., or the vehicle may be coupled to such processing system, entertainment system, control system manufactured separately from the vehicle. For example, one or more LIDAR devices may be attached to different portions of an automobile to ensure coverage of the environment surrounding the automobile. The LIDAR devices may be coupled to a processing system of the automobile (or a control system coupled to the vehicle) and provide data transmitted by other LIDAR devices for processing, or transmit data provided by the processing system to other LIDAR devices via a modulated optical signal.

The specification and drawings are, accordingly, to be regarded in an illustrative sense rather than a restrictive sense.

What is claimed is:

1. A device, comprising:
one or more processors; and
a memory coupled to the one or more processors, the memory including instructions that, when executed by the one or more processors, cause the one or more processors to perform operations comprising:
causing a transmitter to transmit a first modulated optical signal to a first light detection and ranging (LIDAR) device coupled to a vehicle, wherein the transmitter is coupled to infrastructure, and wherein the first modulated optical signal includes an optical carrier signal modulated to include a data signal.

2. The device of claim 1, wherein the infrastructure comprises at least one of a toll booth, a road construction area, a tunnel entrance, a traffic signal, a charging station, an entry gate, or a stand.

3. The device of claim 1, wherein the transmitter is part of a second LIDAR device coupled to the infrastructure.

4. The device of claim 1, wherein the data signal includes a transmitter identification.

5. The device of claim 1, wherein the data signal includes an indication of a location of the infrastructure.

6. The device of claim 1, wherein the data signal includes operating parameters for the transmitter.

7. The device of claim 1, wherein data signal indicates restrictions on entering a limited access area.

8. The device of claim 7, wherein the limited access area comprises at least one of a tunnel, a hospital ambulance entrance, handicap parking space, a high occupancy vehicle (HOV) lane, a parking area, or a portion of a city.

9. The device of claim 7, wherein the infrastructure controls access to the limited access area.

10. The device of claim 1, wherein data signal indicates a toll for entering an area.

11. The device of claim 10, wherein the area comprises at least one of a bridge, a lane, or a portion of a city.

12. The device of claim 10, wherein the infrastructure is a toll booth.

13. The device of claim 1, wherein the data signal includes information regarding at least one of a missing vehicle, a stolen vehicle, or an offline vehicle.

14. The device of claim 1, wherein the data signal hails the vehicle for a requested ride.

15. The device of claim 1, wherein the data signal includes a notification to the vehicle.

16. The device of claim 15, wherein the notification relates to at least one of an emergency vehicle, a road hazard, a school crossing zone, a speed limit change, a construction zone, a traffic accident, or a traffic obstruction.

17. The device of claim 1, wherein the infrastructure is associated with a parking area, and wherein the data signal indicates available parking spaces in the parking area.

18. The device of claim 1, wherein the infrastructure is associated with a parking area, and wherein the data signal indicates a fee to be charged for parking in the parking area.

19. The device of claim 1, wherein the operations further comprise:
receiving data associated with a second modulated optical signal emitted by the first LIDAR device and received by a detector, wherein the detector is coupled to the infrastructure, and wherein the second modulated optical signal is responsive to the first modulated optical signal.

20. A non-transitory computer readable medium storing instructions that, when executed by one or more processors, cause the one or more processors to perform operations comprising:
causing a transmitter to transmit a first modulated optical signal to a first light detection and ranging (LIDAR) device coupled to a vehicle, wherein the transmitter is coupled to infrastructure, and wherein the first modulated optical signal includes an optical carrier signal modulated to include a data signal.

* * * * *